United States Patent [19]
Tanaka et al.

[11] Patent Number: 5,528,687
[45] Date of Patent: Jun. 18, 1996

[54] ECHO CANCELLER

[75] Inventors: Yoshinori Tanaka, Yokohama;
Shigeyuki Unagami, Atsugi;
Masayoshi Inoue, Kawasaki, all of Japan

[73] Assignee: Fujitsu Limited, Kawasaki, Japan

[21] Appl. No.: 201,336

[22] Filed: Feb. 24, 1994

Related U.S. Application Data

[63] Continuation of Ser. No. 80,137, Jun. 23, 1993, abandoned, which is a continuation of Ser. No. 895,240, Jun. 8, 1992, abandoned, which is a continuation of Ser. No. 814,041, Dec. 24, 1991, abandoned, which is a continuation of Ser. No. 690,319, Apr. 26, 1991, abandoned, which is a continuation of Ser. No. 324,741, Mar. 17, 1989, abandoned.

[30] Foreign Application Priority Data

Mar. 17, 1988 [JP] Japan .................................. 63-64269
Apr. 28, 1988 [JP] Japan ................................. 63-105731
Jul. 29, 1988 [JP] Japan ................................. 63-189773

[51] Int. Cl.⁶ .................................................. H04B 3/20
[52] U.S. Cl. ..................... 379/406; 379/410; 379/411; 370/32.1
[58] Field of Search .................... 370/32.1, 32; 379/410, 379/411, 406

[56] References Cited

U.S. PATENT DOCUMENTS

| | | | |
|---|---|---|---|
| 4,574,166 | 3/1986 | Gritton | 370/32.1 |
| 4,621,173 | 11/1986 | Guidoux | 370/32.1 |
| 4,742,510 | 5/1988 | Quantieri et al. | 370/32.1 |

FOREIGN PATENT DOCUMENTS

| | | |
|---|---|---|
| 0036696 | 9/1981 | European Pat. Off. . |
| 0092035 | 10/1983 | European Pat. Off. . |
| 0299648 | 1/1989 | European Pat. Off. . |

OTHER PUBLICATIONS

Macchi et al., "An Echo Canceller with Controlled Power for Frequency Offset Correction," *IEEE Transactions on Communications*, vol. COM-34, No. 4, Apr. 1986, New York, N.Y., pp. 408–411.

Quantieri et al., "Decision-Directed Echo Cancellation for Full-Duplex Data Transmission at 4800 BPS," *ICASSP 86*, Tokyo, JP, 1988, pp. 1337–1340.

Park et al., "A Phase-Adaptive Echo Canceller with Reduced Sensitivity to Power Variations," *IEEE Transactions on Communications*, vol. COM-35, No. 8, Aug. 1987, New York, N.Y., pp. 865–867.

Harman et al., "Frequency Offset Compensation Techniques for Echo-Cancellation-Based Modems," *IEEE/IEICE Global Telecommunications Conference '87*, Nov. 15–18, 1987, Tokyo, JP, pp. 1945–1949.

(List continued on next page.)

*Primary Examiner*—Jeffery Hofsass
*Assistant Examiner*—Scott Wolinsky
*Attorney, Agent, or Firm*—Staas & Halsey

[57] ABSTRACT

An echo canceller provided with an expected echo generating unit which generates an expected echo of a transmission signal and a frequency offset correction unit which detects a phase error between an echo in a received signal and an expected echo from the expected echo generating unit and corrects the frequency offset for the expected echo by an offset frequency estimated based on the phase error, wherein use is made of the expected echo after offset correction by the frequency offset correction unit so as to suppress the echo in the received signal, the frequency offset correction unit using the phase error obtained after normalizing the phase error by the magnitude of the echo in the received signal. By this, it is possible to perform frequency offset correction adaptive to the far-end echo characteristics. Further, it is desirable to perform the frequency offset correction after it is confirmed that the rate of change of the output from a subtractor for cancellation of the near-end echo has become almost zero.

40 Claims, 17 Drawing Sheets

OTHER PUBLICATIONS

J. M. Cioffi, "Chapter 4—A Memory-Efficient Adaptive Algorithm for Steady-State Adjustment of the Echo Canceller," Information Systems Laboratory, Stanford, CA, Jan. 4, 1988, pp. 1–11.

J. M. Cioffi, "Chapter 5—Frequency Offset Tracking in the Far-End Canceller," Information Systems Laboratory, Stanford, CA, Jan. 4, 1988, pp. 1–19 and Figures.

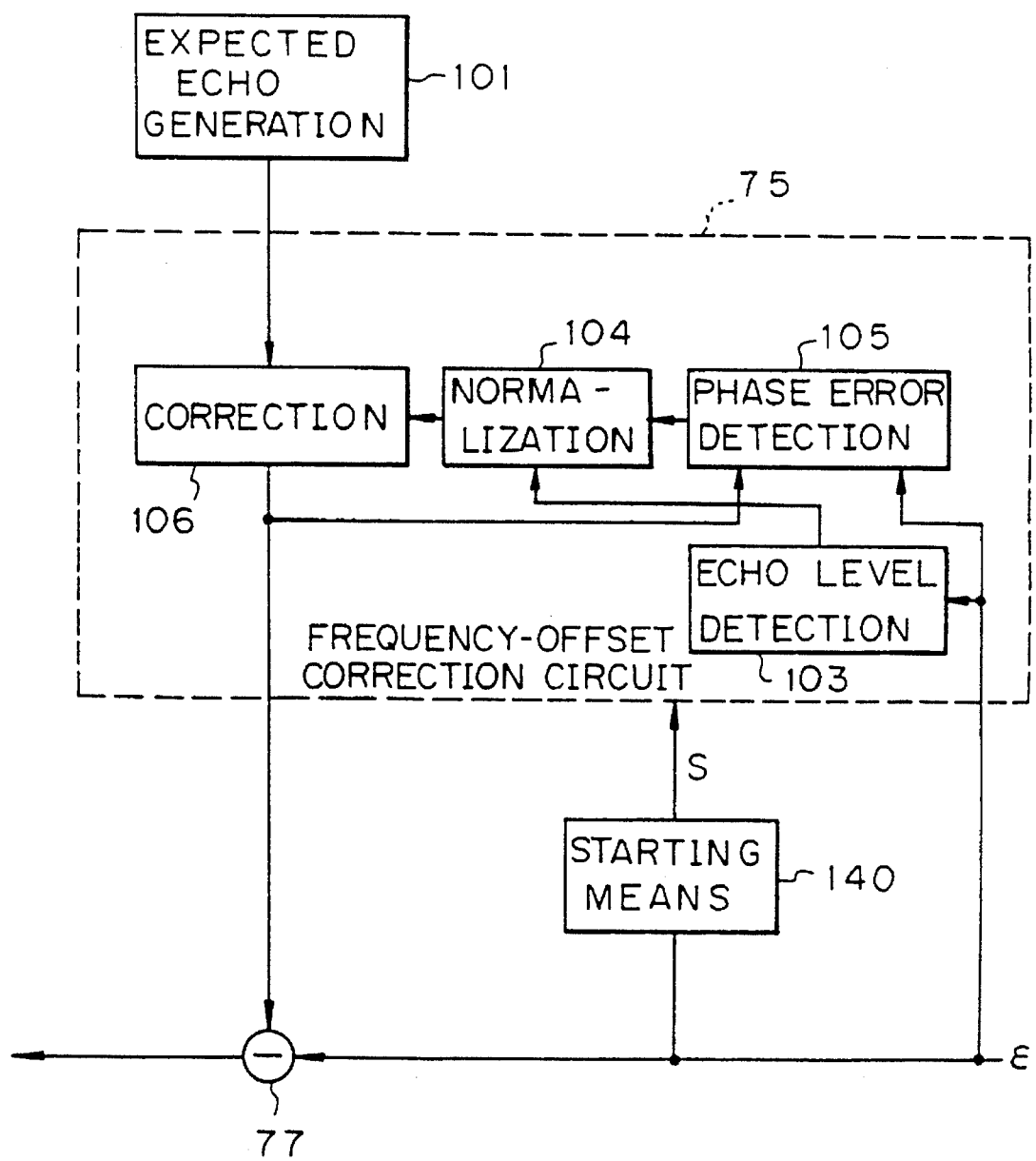

| Fig.14A | Fig. 14B |

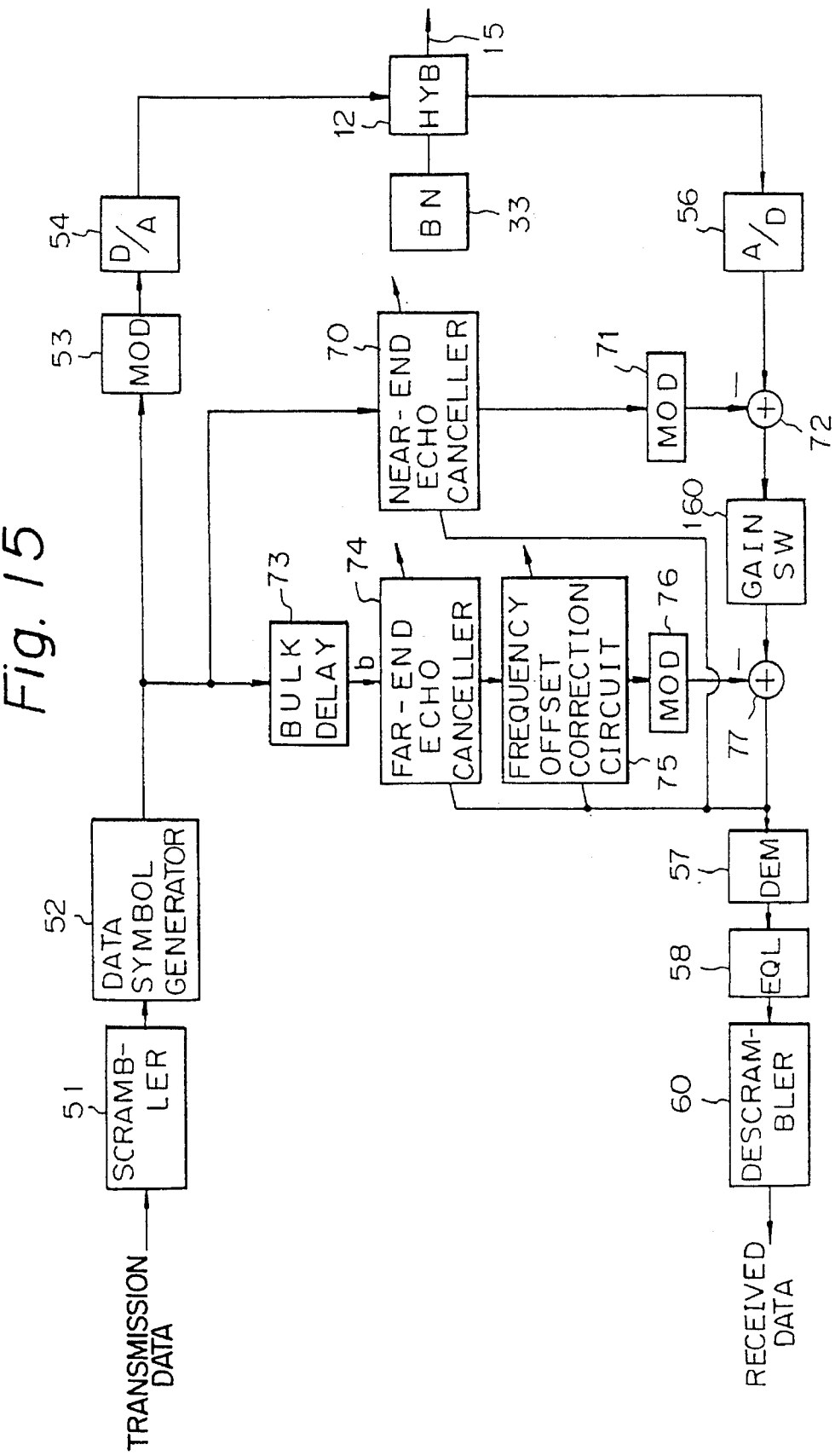

ECHO CANCELLER

This application is a continuation of application Ser. No. 08/080,173, filed Jun. 23, 1993, now abandoned which is a continuation of 07/895,240, filed Jun. 08, 1992, now abandoned, which is a continuation of 07/814,041, filed Dec. 24, 1991, now abandoned, which is a continuation of 07/690,319, filed Apr. 26, 1991, now abandoned, which is a continuation of 07/324,741, filed Mar. 17, 1989, now abandoned.

BACKGROUND OF THE INVENTION

1. Field of the Invention

The present invention relates to an echo canceller used, for example, for a two-wire full-duplex data modem etc.

In a full-duplex communication system using the above-mentioned two-wire full-duplex data modem, a hybrid circuit is adopted for the two wire-four wire conversion in the data modem and exchange. At the portion where this hybrid circuit is provided, as mentioned later, a near-end echo and far end echo return to the transmission side modem and interfere with normal communication. Am echo canceller is used to eliminate this interference with communication.

2. Description of the Related Art

One of the technical problems in conventional echo cancellers has been the frequency offset, explained in detail later. This is a problem unique to frequency division multiplex (FDM) type communication systems. If the echo is cancelled with consideration given to this frequency offset too, a high quality of echo cancellation can be realized. Therefore, in the past, a frequency-offset correction circuit has been built into the echo cancellers.

However, the echo cancellers in the prior art cannot correct the frequency offset for all far end echo characteristics. From this viewpoint, there is a first problem in that an echo canceller with a sufficiently good quality cannot be realized.

Further an echo canceller must process two echoes, the near-end echo and far-end echo, separately, but in actuality since the two echoes return to the transmission side modem simultaneously with the low level far end echo buried in the high level near end echo, there is a second problem that the two are difficult to distinguish. This second problem makes the resolution of the above mentioned first problem increasingly difficult. The reason for this is that the above-mentioned first problem is caused due to only the far-end echo and has nothing at all to do with the near-end echo.

SUMMARY OF THE INVENTION

Therefore, the present invention has as its first object the provision of an echo canceller which can correct the frequency offset for the far-end echo characteristics and has as its second object the provision of an echo canceller which can distinguish the far-end echo characteristics from the near-end echo characteristics.

To achieve the above-mentioned objects, the present invention is first constituted so as to detect the level of the echo in a received signal, normalize the phase error between the expected echo and the actual echo using the detected echo level, and estimate the offset frequency to be collected using the normalized phase error and is second constituted so as to start cancellation of the near-end echo during a training term for cancellation of the near-end echo and far-end echo and to start the cancellation of the far-end echo after there are no longer any variations in the level of the near-end echo.

BRIEF DESCRIPTION OF THE DRAWINGS

The above object and features of the present invention will be more apparent from the following description of the preferred embodiments with reference to the accompanying drawings, wherein:

FIG. 13 is a block diagram of the principle of a third embodiment according to the present invention;

FIG. 15 is a circuit diagram for explaining the gain switch generally used for echo cancellers;

DESCRIPTION OF THE PREFERRED EMBODIMENTS

Before describing the embodiments of the present invention, the related art and the disadvantages therein will be described with reference to the related figures.

Figure 1:
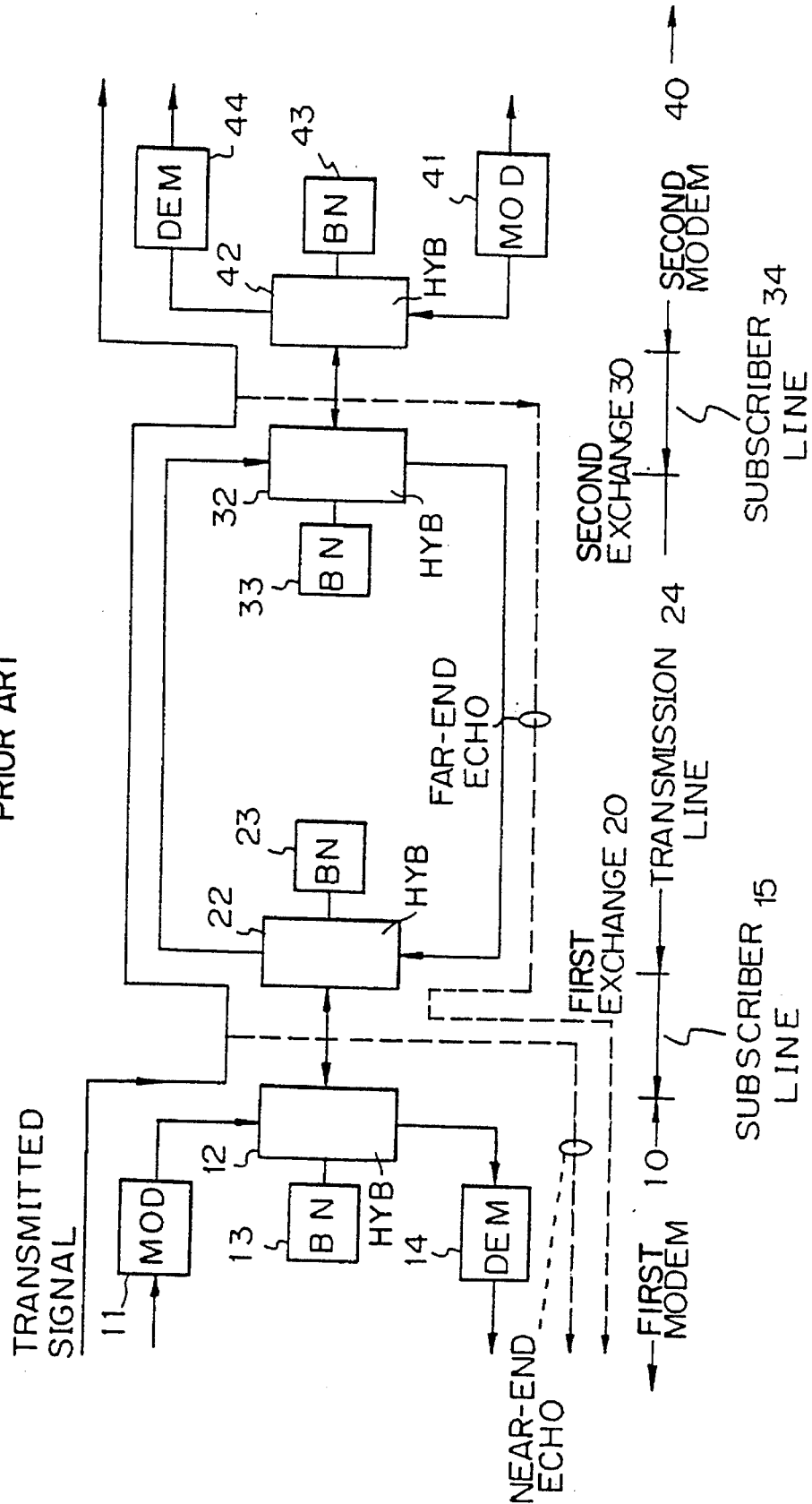
FIG. 1 is a block diagram of a two-wire full duplex communication system.

An example of the constitution of a full-duplex communication system using a two-wire circuit is shown in FIG. 1. In the figure, the own side data modem 10 includes a modulation circuit (MOD) 11, a hybrid circuit (HYB) 12, a balancing network (BN) 13, and a demodulation circuit (DEM) 14 and is accommodated in an own (i.e., first) side exchange through a two-wire subscriber line 15. The exchange 20 is provided with a hybrid circuit 22 and a balancing network (BN) 23 and is connected to the other (i.e., second) side exchange 30 through a four-wire transmission line 24 by the hybrid circuit 22. The other side exchange 30 is provided with a hybrid circuit (HYB) 32 and a balancing network (BN) 33 and houses the other (i.e., second) side data modem 40 through a two-wire subscriber line 34. The data modem 40 includes a modulation circuit (MOD) 41, a hybrid circuit (HYB) 42, a balancing network (BN) 43, and a demodulation circuit (DEM) 44. Note that illustration is made of a system using a V.32 modem.

In the communication system, use is made of the hybrid circuits 12 and 22, in the first side, and 32 and 42 in the second side for two-wire to four wire conversion between the respective data modems and exchanges, but if the impedances of the subscriber lines 15 and 34 and balancing networks 13, 23, 33, and 43 connected to these hybrid circuits are not balanced, an echo is caused due to the leakage of the transmitted signal. As a result, the transmitted signal sent from the own side modem 10 becomes an echo and returns to the own side modem to interfere with normal communication.

Echoes include, depending on the position of generation, near-end echoes which are caused by the leakage of the transmitted signal sent from the modem 10 to the receiver side by the hybrid circuit 12 in the modem 10 and far-end echoes which are caused by the leakage of the transmitted signal which reaches the far-end other side exchange 30 to the opposite side circuit by the hybrid circuit 32. For full-duplex communication free from data error in the modem 10, both of these far-end and near-end echoes have to be sufficiently suppressed.

Figure 2:
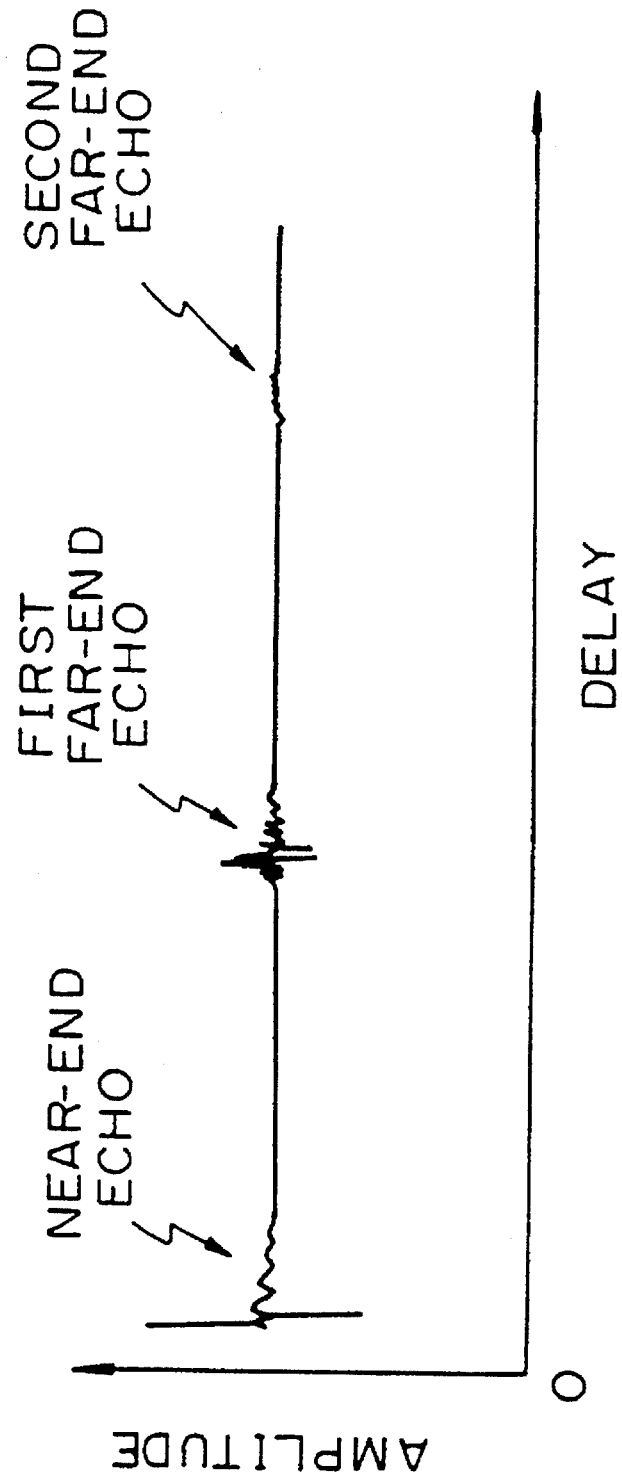
FIG. 2 is a waveform diagram showing the impulse response of an echo.

An example of the impulse response of near end and far-end echoes is shown in FIG. 2. In the figure, the horizontal axis shows the amounts of delay from the transmission of the transmitted signal to the generation of corresponding echoes, while the vertical axis shows the respective amplitude level of the echoes. As shown in the figure, the near-end echo is comparatively large in level and the amount of delay is small. On the other hand, the far-end echo passes through the transmission line 24, so the amount of delay is great, for example, in the case of a one-hop satellite transmission path, there is a delay amount of about 600 msec, and the level is small. Further, the far-end echo sometimes has a frequency offset.

An echo canceller is known as a means for suppressing echoes. An echo canceller estimates the same echo (expected echo) as the resounding echo and subtracts this from the received signal so as to suppress the echo. An example of the conventional constitution of a full-duplex modem provided with such an echo canceller is shown in FIG. 3.

Figure 3:
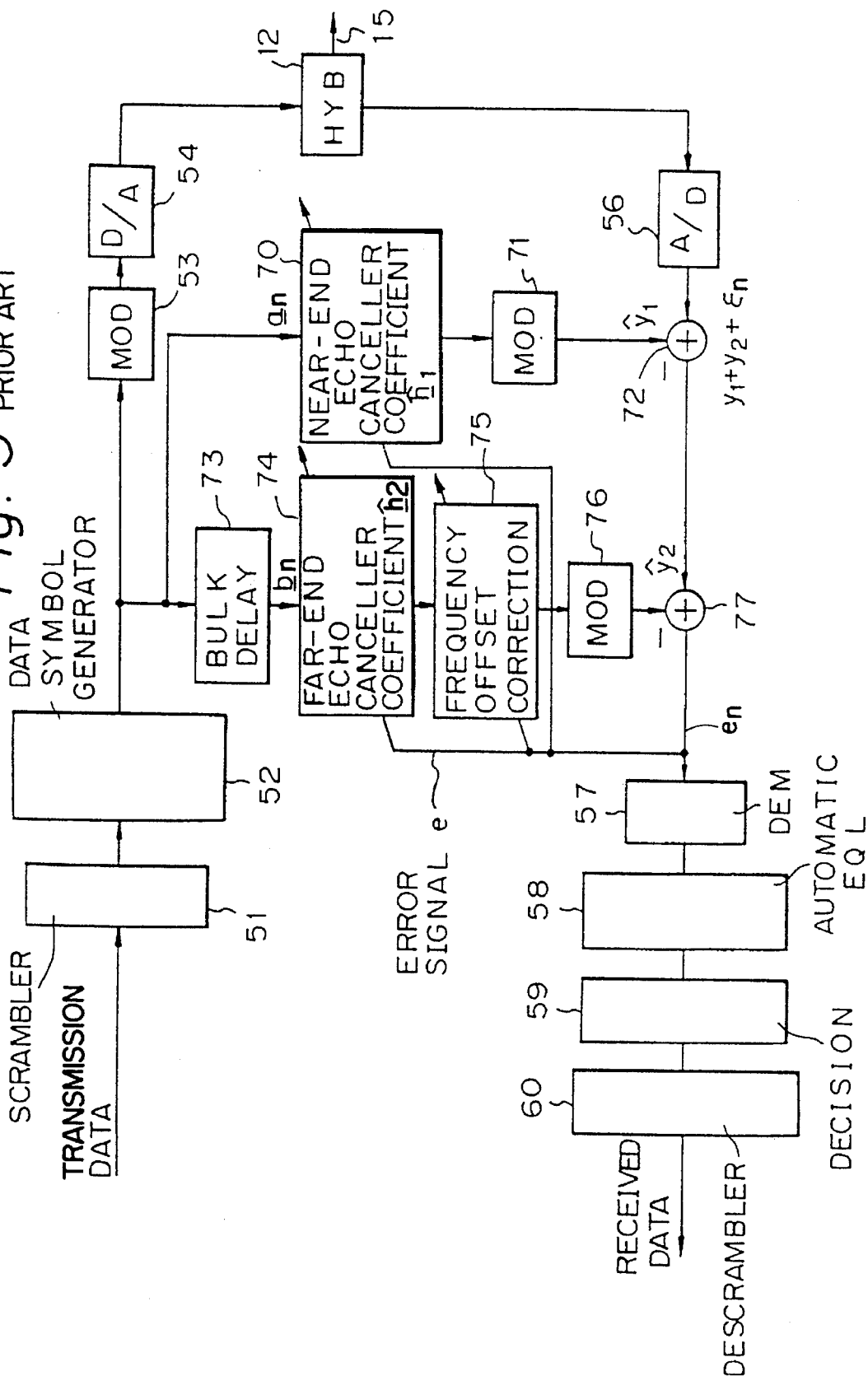
FIG. 3 is a block diagram of an example of the constitution of a data modem provided with a conventional type of echo canceller.

In FIG. 3, the transmission data is modulated by a modulation circuit (MOD) 53, after passing through a scrambler 51 and a data symbol generating circuit 52, converted from digital to analog form by a D/A converter 54 and then is transmitted to a two-wire subscriber line 15 through a hybrid circuit (HYB) 12. Further, the reception signal, received from the subscriber line 15, is input to the demodulation circuit (DEM) 57 after passing through an analog/digital conversion circuit (A/D) 56 and subtraction circuits 72 and 77 for demodulation, then processed through the automatic equalizing circuit (EQL) 58, code decision circuit 59, and descrambler 60 and output as received data.

The echo canceller unit includes a near-end echo canceller 70 for the near-end echo and a far-end echo canceller 74 for the far-end echo. Preceding the far-end echo canceller 74 is a bulk delay circuit 73 for compensating for the transmission delay of the far-end echo and following it is a frequency-offset correction circuit 75 for correcting the frequency offset.

The near-end echo canceller 70 generates a signal which is the same as the near-end echo, based on the transmission signal, applies the same modulation to this signal, as that of the modulation circuit 53, by the modulation circuit 71, and then subtracts this thus generated and modulated from the received signal by the subtraction circuit 72 so as to cancel the near-end echo in the received signal. Further, the far-end echo canceller 74 delays the transmission signal by the amount of delay of the far-end echo by the bulk delay circuit 73, then generates the same signal as the far-end echo based on this delayed transmission signal, performs a frequency offset on this bulk delayed transmission signal by the frequency offset correction circuit 75, then applies the same modulation thereto as that of the modulation circuit 53, and subtracts the result (i.e., the bulk delayed and modulated transmission signal) from the received signal (i.e., as already processed through subtraction circuit 72) by the subtraction circuit 77 to cancel the far-end echo from the received signal. The tap coefficients of the near-end echo canceller 70 and the far-end echo canceller 74 are subjected to adaptive control based on the error signal $e_n$ of the output of the subtraction circuit 77.

The frequency-offset correction circuit 75 corrects the frequency offset occurring due to the deviation of the modulation frequency and demodulation frequency for the frequency division multiplex in an exchange and is required only for the far-end echo going through the opposite side exchange.

Figure 4:
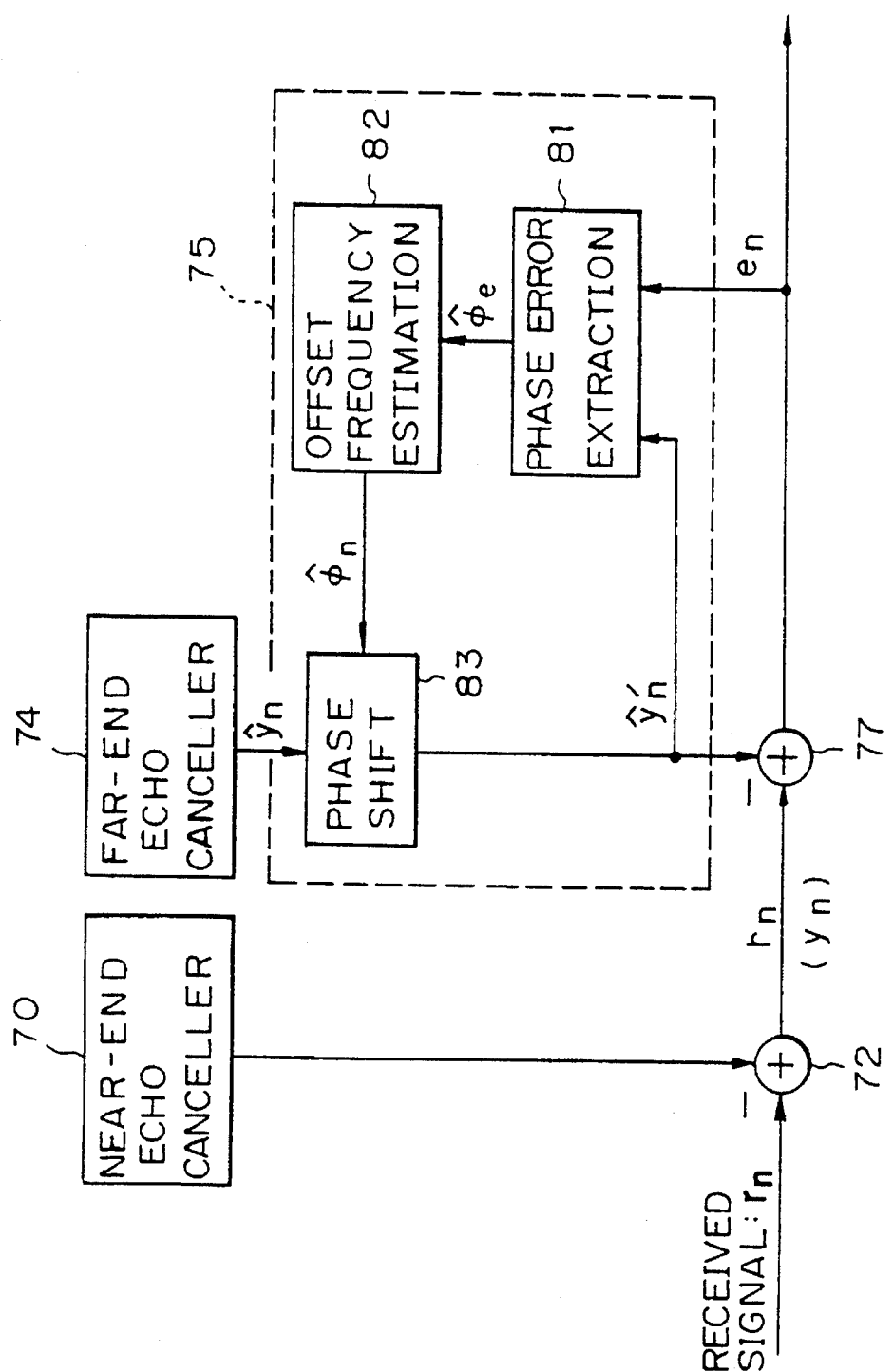
FIG. 4 is a block diagram of an example of the constitution of a conventional frequency-offset correction circuit.

An example of the constitution of a conventional frequency-offset correction circuit 75 is shown in FIG. 4. As illustrated, this includes a phase shift circuit 83 which rotates an output signal $\hat{y}_n$ from the far-end echo canceller 74 by a phase rotation amount $\hat{\phi}_n$ and generates an expected far-end echo signal $\hat{y}'_n$, a phase error extracting circuit 81 which extracts a phase error $\hat{e}_e$ between the expected far-end error signal $\hat{y}'_n$ and an error signal $e_n$, and an offset frequency estimation circuit 82 which estimates the offset frequency based on the phase error $\hat{\phi}_e$ and outputs a phase rotation amount $\hat{\phi}_n$ so as to make the phase error $\hat{\phi}_e$ zero.

This frequency offset correction circuit 75 extracts the phase error $\hat{\phi}_e$ using the expected far end echo $\hat{y}'_n$ obtained by correction of the frequency offset with respect to the output signal $\hat{y}_n$ of the far-end echo canceller 74, the error signal $e_n$ obtained by subtraction of the expected far-end echo $\hat{y}'_n$ from the received signal $\hat{y}'_n$ corrects the estimated offset frequency by this phase error $\hat{\phi}_e$, and uses the result as the correction value for the next sample $\hat{y}_{n+1}$. The above operation is repeated with every sampling, whereby adaptive correction of the frequency offset is performed.

That is, the output signal $\hat{y}_n$ of the far-end echo canceller 74 is rotated in phase by a phase rotation amount $\hat{\phi}_n$, output by the offset frequency estimation circuit 82 by the phase shift circuit 83 and which produces as the output thereof the expected far-end echo signal $\hat{y}'_n$. The expected far-end echo $\hat{y}'_n$ is subtracted from the received signal $r_n$, including the far-end echo $\hat{y}'_n$ with a frequency offset by a subtraction circuit 77, whereby the far-end echo $\hat{y}'_n$ is cancelled.

The phase error extraction circuit 81 extracts the phase error $\hat{\phi}_e$ between the actual far-end echo $\hat{y}'_n$ and A the expected far-end echo $\hat{y}'_n$ from the error signal en with the expected far-end echo $\hat{y}'_n$, and the offset frequency estimation circuit 82 performs estimation of the correct offset frequency based on the phase error $\hat{\phi}_e$ and decides the phase rotation amount $\hat{\phi}_{n+1}$ with respect to the next sample $\hat{y}_{n+1}$.

An explanation of a first embodiment of the present invention will be given below.

In general, the size of the far-end echo $\hat{y}'_n$ in the received signal $r_n$ differs in value for each line to which the modem is connected, as is known. This is because the transmission loss differs with each line.

On the other hand, the size of the phase error $\hat{\phi}_e$ which is extracted by the phase error extraction circuit 81 in the frequency offset correction circuit 75 depends on the size of the far-end echo $\hat{y}'_n$ in the received signal $r_n$ (proportional to the far-end echo power or the far-end echo amplitude) and therefore the estimated offset value of the offset frequency estimation circuit 82 is also affected by the level of the far-end echo $\hat{y}'_n$. As a result, the characteristics of the frequency offset correction circuit 75 are influenced by the connected line, i.e., the size of the far-end echo $\hat{y}'_n$ in the received signal. For example, when the level of the far-end echo $\hat{y}'_n$ is small, correct frequency offset correction is not possible, the following speed becomes slower, or other problems arise.

Therefore, the first object of the present invention is to make possible stable frequency offset correction of far-end echoes which is not dependent on the variations of level of the far-end echoes.

Figure 5:
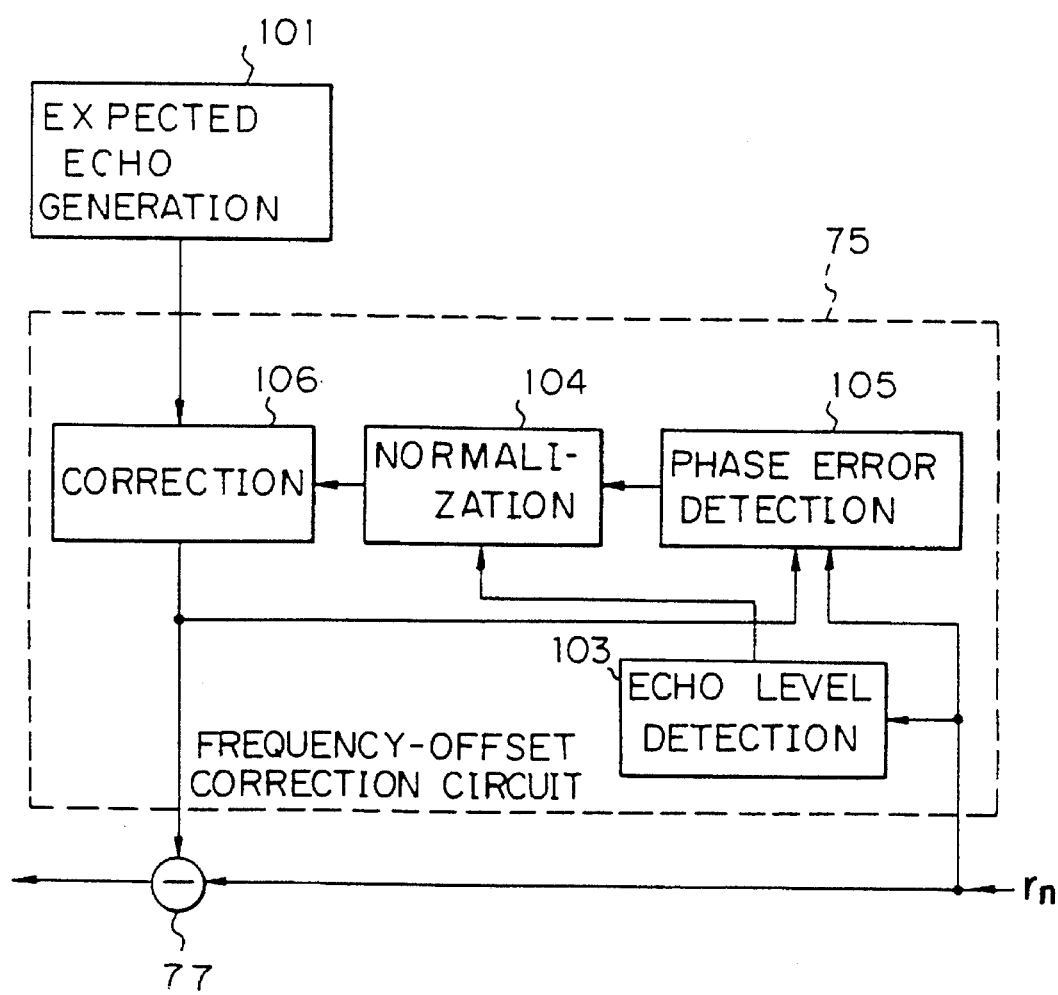
FIG. 5 is a block diagram of the principle of a first embodiment according to the present invention.

FIG. 5 is a block diagram of the principle of a first embodiment according to the present invention.

The echo canceller according to the first embodiment of the present invention is provided with an expected error generation circuit 101 which generates an expected error of a transmission signal and a frequency offset correction circuit 75. The frequency offset correction circuit 75 is provided with a phase error detection circuit 105 which detects the phase error between the echo in the received signal and the expected echo of the expected echo generation circuit 101, a correction circuit 106 which corrects the frequency offset of the expected echo by the frequency offset estimated based on the phase error, an echo level detecting circuit 103 which detects the size of the echo in the received signal, and a normalizing circuit 104 which normalizes the phase error by the echo level detected by the echo level detection circuit 103. The echo in the received signal is suppressed by use of the expected echo after correction of the offset by the frequency offset correction circuit 75.

The phase error detected by the phase error detection circuit 105 differs in size along with variations in the echo level in the received signal. This variation interferes with normal estimation of the offset frequency. Therefore, use is made of the echo level detected by the echo level detection circuit 103, the phase error is normalized by the normalizing circuit 104, and the offset frequency is estimated based on the normalized phase error. The offset frequency estimated in this way is used for correction of the frequency offset of the expected echo and then the expected echo, corrected for frequency off-set, is used for cancellation of the echo in the received signal.

Figure 6:
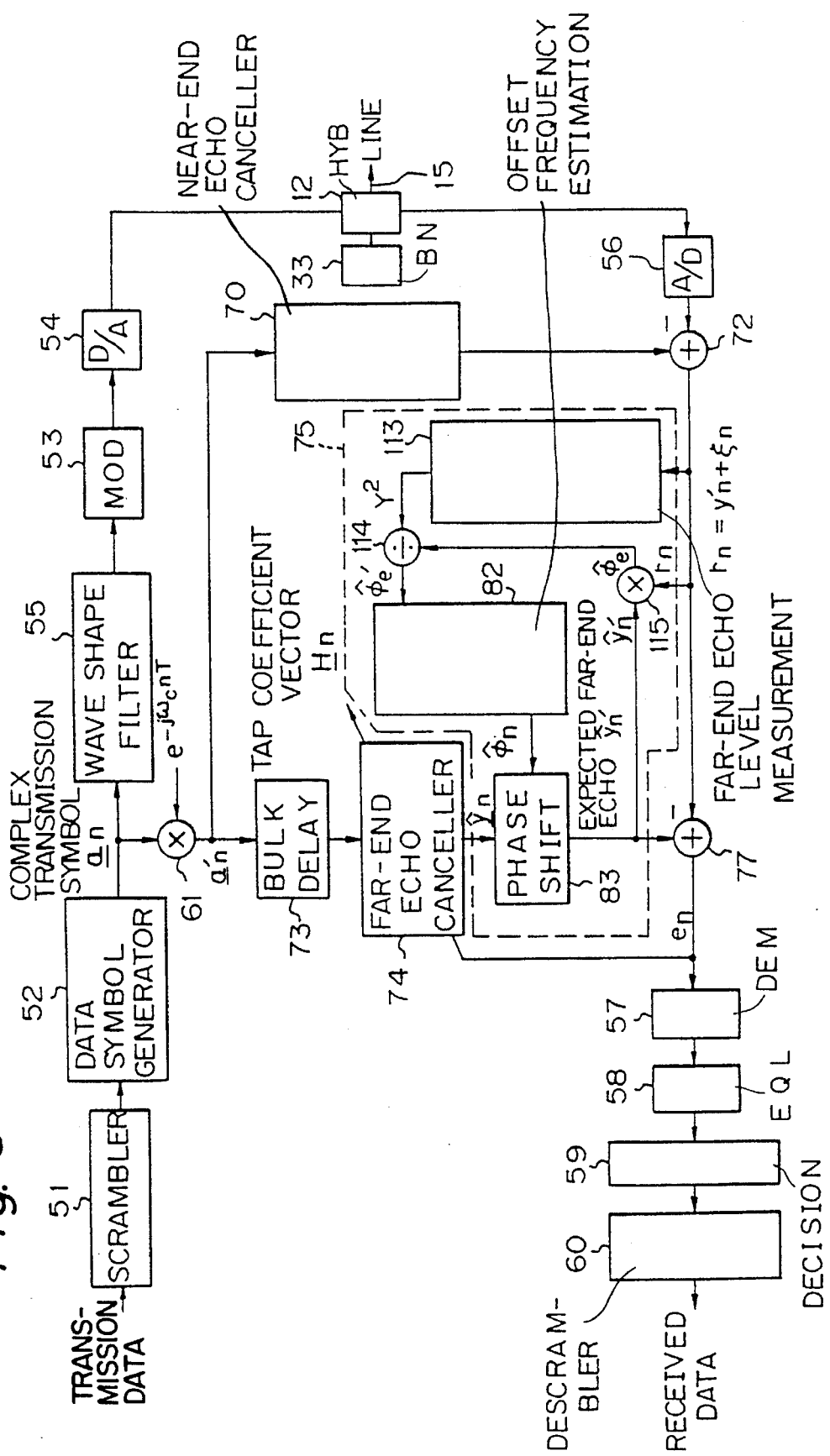
FIG. 6 is a block diagram of details of an echo canceller of the first embodiment according to the present invention.

FIG. 6 is a block diagram of details of an echo canceller of the first embodiment according to the present invention. In the figure, the transmission circuit includes a scrambler 51, a data symbol generating circuit 52, a waveform shaping filter 55, a modulation circuit 53, a D/A conversion circuit 54, and a hybrid circuit 12. The reception circuit includes hybrid circuit 12, an A/D conversion circuit 56, subtraction circuits 72 and 77, a demodulation circuit 57, an automatic equalizing circuit 58, a code decision circuit 59, and a descrambler 60, the latter outputting the received data.

The complex transmission signal $\underline{a}_n$ output from the data symbol generating circuit 52 in the transmission circuit is input through the modulation circuit 61 to the near-end echo canceller 70 and along with this is input through the bulk delay circuit 73, which corrects the delay of the far-end echo, to the far-end echo canceller 74. Note that the n in the suffix means the sampling number. Further, the underbar indicates a vector quantity. The output signal of the near-end echo canceller 70 is input to the subtraction circuit 72 where it is subtracted from the received signal. The result is the cancellation of the near-end echo from the received signal.

On the other hand, the output signal $\hat{y}_n$ of the far-end echo canceller 74 is input through the frequency offset correction circuit 75 to the subtraction circuit 77, where it is subtracted from the received signal, whereby the far-end echo $\hat{y}'_n$ in the received signal $r_n$ is cancelled. Note that the modulation circuit 61 performs the same modulation as the modulation circuit 53 on the input signal.

The near-end echo canceller 70, far-end echo canceller 74, and frequency offset correction circuit 75 are constituted so as to be adaptively controlled by the error signal $e_n$ output from the subtraction circuit 77.

The frequency offset correction circuit 75 is provided with the above-mentioned phase error extraction circuit 115, offset frequency estimation circuit 82, and phase shift circuit 83 and also a far-end echo power measuring circuit 113 which measures the signal power $y^2$ of the far-end echo $\hat{y}'_n$ in the received signal $r_n$ and a divider 114 which forms a normalizing circuit 104 (in FIG. 5) which normalizes the phase error $\hat{\phi}_e$ from a multiplier 115 which forms a phase error extraction circuit 105 using a far-end echo power $y^2$ measured by the far-end echo power measurement circuit 113. The offset frequency estimation circuit 82 is constituted so as to perform estimation of the offset frequency using the phase error $\hat{\phi}'_e$ normalized by the normalizing circuit 114.

The operation of the apparatus of FIG. 6 will be explained below:

The echo canceller is constituted by a near-end echo canceller 70 and a far-end echo canceller 74. The echo cancellers 70 and 74 receive, as a common input, the complex symbol $\underline{a}'_n$ obtained by rotating the complex transmission signal $\underline{a}_n = X_n + jy_n$ of the baseband at the carrier frequency $\omega_c$ by the modulation circuit 61. That is, $$\underline{a}'_n = \underline{a}_n \cdot \exp(-j\omega_c \cdot nT) \tag{1}$$

Here, $\omega_c$ is the carrier frequency and $1/T$ is the modulation speed. Note that the far-end echo canceller 74 receives as input a signal delayed by the bulk delay circuit 73 by exactly the amount of delay of the far-end echo $y'_n$ measured in advance.

If the input data vector sequence $\underline{A}_n^T$ is $$\underline{A}_n^T = (\underline{a}'_n, \underline{a}'_{n-1}, \underline{a}'_{n-2}, \ldots, \underline{a}'_{n-N+1}) \tag{2}$$

and the tap coefficient vector $\underline{H}_n^T$ is $$\underline{H}_n^T = (\hat{\underline{h}}_{n,0}, \hat{\underline{h}}_{n,1}, \hat{\underline{h}}_{n,2}, \ldots, \hat{\underline{h}}_{n,N-1}) \tag{3}$$

the far-end echo canceller 74 outputs the output vector $\hat{y}'_n$ calculated by the following equation (4).

Note that here N is a tap coefficient and the hat "^" shows the estimated value.

$$\hat{y}_n = \underline{A}_n^T \cdot \underline{H}_n \ (=\hat{y}_n + j\hat{y}_n^*) \tag{4}$$

The output signal $\hat{y}_n$ of the far-end echo canceller 74 is next input to the frequency offset correction circuit 75 and is rotated by exactly the phase rotation amount $\hat{\phi}_n$ of the offset frequency estimation circuit 82 by the phase shift circuit 83 of the frequency offset correction circuit 75. By taking an imaginary part thereof, the expected far-end echo $\hat{Y}'_n$ is produced. That is, $$\begin{aligned}\hat{y}_n' &= Im\,[\hat{y}_n \exp(j\hat{\phi}_n)] \\ &= \hat{y}_n \sin\hat{\phi}_n + \hat{y}_n^* \cos\hat{\phi}_n\end{aligned} \quad (5)$$

Note that the tap coefficient vector $\underline{H}_n^T$ of the far-end echo canceller 74 is adaptively controlled based on the error signal $e_n$ $$e_n = r_n - \hat{y}'_n \quad (6)$$

Here, $r_n$ is the received signal after cancellation of the near-end echo.

On the other hand, the phase error extraction multiplier 115 receives as input the expected far-end echo $\hat{y}'_n$ and the received signal $r_n$. The multiplier 115 determines the product of those inputs, thereby producing an output the phase error $\hat{\phi}_n$ of the far-end echo $y'_n$, that is, the phase deviation between the actual far-end echo $y'_n$ and the expected far-end echo $\hat{y}'_n$.
That is, $$\begin{aligned}\hat{\phi}_e &= \hat{y}_n' \cdot r_n \\ &= \hat{y}_n'\,(y_n' + \xi_n) \\ &= (\hat{y}_n \sin\hat{\phi}_n + \hat{y}_n^* \cos\hat{\phi}_n) \times \\ &\quad (y_n \cos\phi_n - y_n^* \sin\phi_n + \xi_n)\end{aligned} \quad (7)$$

Here, is signal components other than the far-end echo, such as the noise, a residual near-end echo, and the far-end data signal.

In the above equation (7), the actual far-end echo $y'_n$ is expressed by $$y'_n = y_n \cos\phi_n - y_n^* \sin\phi$$

Here, $y_n$ is the output of the echo path not having a frequency offset, $y_n^*$ is the Hilbert conversion of $y_n$, $\phi_n = \omega_0 \cdot nT$ and $\omega_0$ is the offset angular frequency. That is, the actual far-end echo $y'_n$ is considered the output $y_n$ of the echo path not having a frequency offset subjected to single side band modulation at the offset fequency $\omega_0$.

Here, if the estimation of the transmission characteristics of the echo path by the echo canceller is assumed to be done well, the approximation of $y_n \cong y_n$, $y_n^* \cong y_n^*$ stands, so equation (7) can be approximated as follows:

$$\hat{\phi}_e = y^2 \cos\phi_n \sin\hat{\phi}_n - y^{*2} \cos\hat{\phi}_n \sin\phi_n + y_n y_n^* (\cos\phi_n \cos\hat{\phi}_n - \sin\phi_n \sin\hat{\phi}_n) + (y_n \sin\hat{\phi}_n y_n^* \cos\hat{\phi}_n)\xi_n \quad (8)$$

Here, the estimated value $E\,[\hat{\phi}_e]$ of the phase error $\hat{\phi}_e$ is found as follows from the fact that $y_n y_n^*$ are noncorrelative signals.

$$\begin{aligned}E\,[\hat{\phi}_e] &= Y^2 \sin(\hat{\phi}_n - \phi_n) + Y \cdot R \\ &= Y^2 (\hat{\phi}_n - \phi_n) + Y \cdot R\end{aligned} \quad (9)$$

Here,
$Y^2 = E\,[y^2] = E\,[y^{*2}]$
$R^2 = E\,[\xi^2]$

As will be understood from equation (9), the phase error $\hat{\phi}_e$ is proportional to the phase error $(\hat{\phi}_n - \phi_n)$ between the expected far-end echo $\hat{y}'_n$ and the actual far-end echo $y'_n$ and further is proportional to the far end power $y^2$ (Y·R time average is 0). Therefore, when the level of the far-end echo is small, the phase error $\hat{\phi}_e$ becomes small, so there is a possibility of the frequency offset estimation not going well.

Therefore, the far-end echo power $Y^2$ is measured from the received signal $r_n$ in advance by the far-end echo power measurement circuit 113 and the phase error $\hat{\phi}_e$ from the phase error extraction multiplier 115 is divided by the far-end echo power $Y^2$ and normalized, whereby a phase error $\hat{\phi}'_e$ not dependent on the far-end echo level is obtained. The offset frequency estimation circuit 82 estimates the offset frequency of the far-end echo based on this phase error $\hat{\phi}'_e$ and decides on the phase rotation amount $\hat{\phi}_{n+1}$ for the next output sample $\hat{y}_{n+1}$ of the echo canceller.

Note that the measurement of the far-end echo power $y^2$ by the far-end echo power measurement circuit 113 is performed in the training term, in turn performed before the data communication, and that the measurement value is held continuously during the following communication term. As opposed to this, the offset correction performed by the phase error extraction circuit 115, offset frequency estimation circuit 82, and phase shift circuit 83 is performed with every sample while communication is underway.

Figure 7:
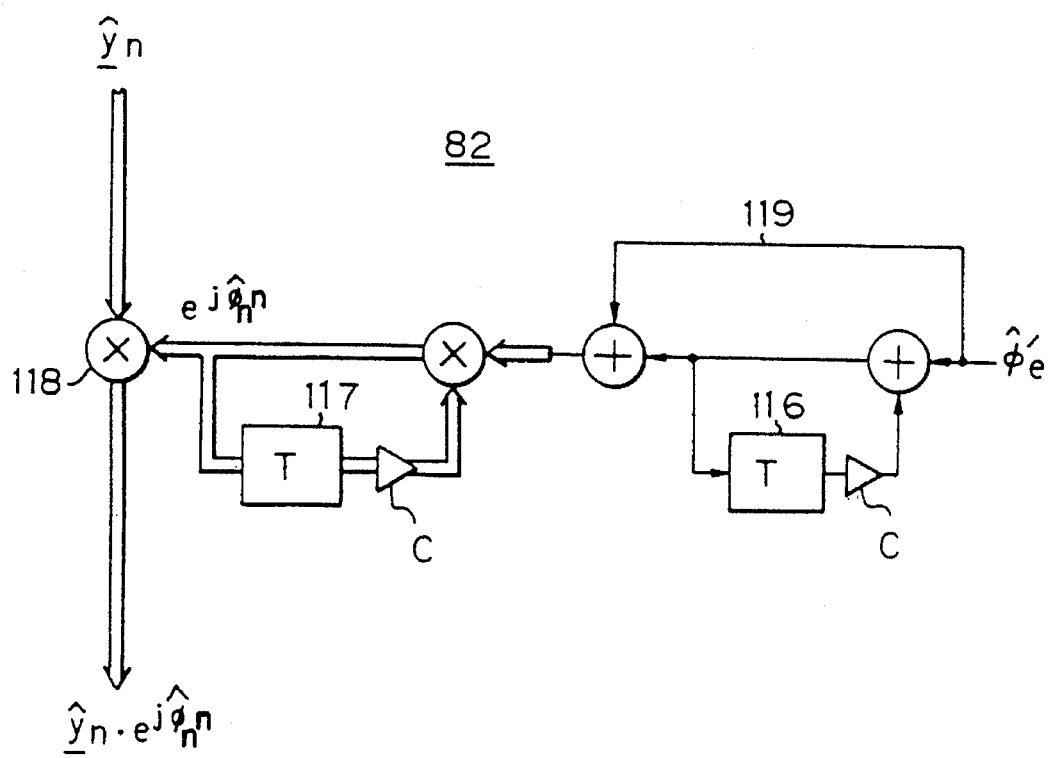
FIG. 7 is a view showing the concrete constitution of an offset frequency estimation circuit 82.

FIG. 7 is a view showing the concrete constitution of an offset frequency estimation circuit 82. In the figure, reference numeral 116 is an integration circuit which includes a delay circuit T, a tap setter C which multiplies the output by a suitable control coefficient, and an adder $\oplus$. After this there is a vector integration circuit 117 which has a multiplier $\otimes$. A multiplier 118 forms a complex multiplier. Note that reference numeral 119 is a feedback path which stabilizes the operation of the offset frequency estimation circuit 82.

In realizing the first embodiment of the present invention, various modifications are possible. In the above-mentioned specific example (FIG. 6), use is made of the power $Y^2$ of the far-end echo for normalizing the phase error from the phase error extraction circuit (115), but the present invention is not limited to this and use may be made of the amplitude Y of the far-end echo for normalizing the phase error $\hat{\phi}_e$.

Figure 8:
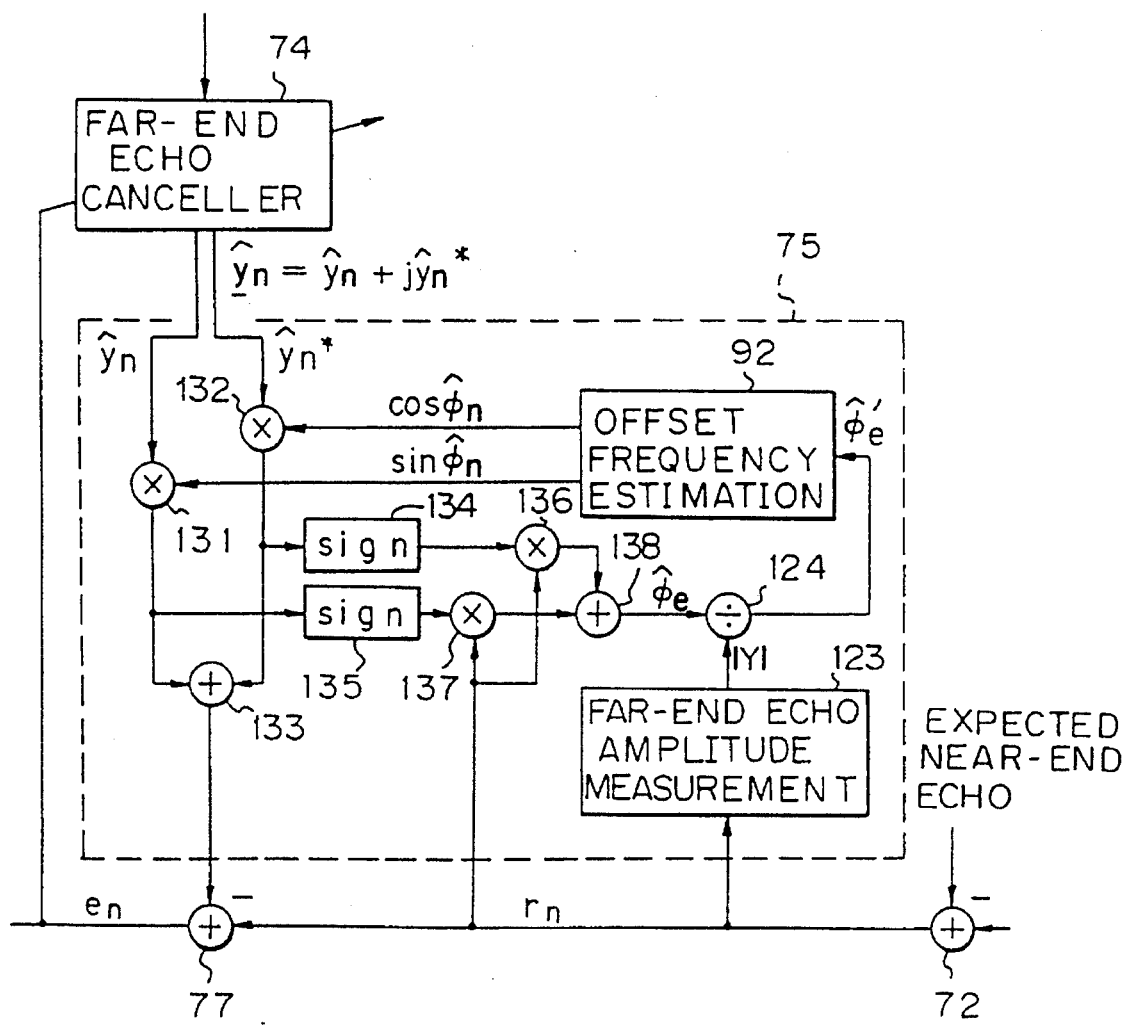
FIG. 8 is a block diagram of another embodiment of an echo canceller based on the first embodiment of the present invention.

That is, FIG. 8 is a block diagram of an embodiment in the case of normalizing the phase error using this far-end echo amplitude Y, wherein there is shown a far-end echo canceller 74 and a frequency offset correction circuit 75.

In this embodiment, the phase shift circuit is constituted by multiplication circuits 131 and 132 which respectively multiply the $\hat{y}_n$, $\hat{y}_n^*$ of the $\hat{y}_n = \hat{y}_n + j\hat{y}_n$ output signal of the far-end echo canceller 74 and the rotational phases $\sin\hat{\phi}_n$, $\cos\hat{\phi}_n$ from the offset frequency estimation circuit 92 and an addition circuit 133 which adds the outputs of the multiplication circuits 131 and 132. The phase error extraction circuit is constituted by the sign function circuits 134 and 135 to which are input the output signals of the multiplication circuits 131 and 132, multiplication circuits 136 and 137 which multiply the received signals $r_n$ with the output signals from the sign function circuits 134 and 135, and an addition circuit 138 which adds the output signals from the multiplication circuits 136 and 137. Further, the far-end echo amplitude measurement circuit 123 is a circuit for measuring the amplitude |Y| of the far-end echo $y'_n$ in the received signal $r_n$. The already mentioned normalization circuit 104 is formed by the multiplier 124 for normalizing the phase error $\hat{\phi}_e$ by dividing it by the far-end echo amplitude Y.

The operation of the example of FIG. 8 will be explained below. In this example, the phase error $\phi_e$ is found by the following equation (10):

$$\hat{\phi}_e = (\text{sign } [\hat{y}_n \sin\hat{\phi}_n] + \tag{10}$$
$$\text{sign } [\hat{y}_n{}^* \cos\hat{\phi}_n]) \, r_n$$
$$= (\text{sign } [\hat{y}_n \sin\hat{\phi}_n] + \text{sign } [\hat{y}_n{}^* \cos\hat{\phi}_n]) \times$$
$$(y_n \cos\phi_n - y_n{}^* \sin\phi_n)$$
$$= \text{sign } [\hat{y}_n \sin\hat{\phi}_n] \, y_n \cos\phi_n -$$
$$\text{sign } [\hat{y}_n{}^* \cos\hat{\phi}_n] \, y_n{}^* \sin\phi_n +$$
$$\text{sign } [\hat{y}_n{}^* \cos\hat{\phi}_n] \, y_n \cos\phi_n -$$
$$\text{sign } [\hat{y}_n \sin\hat{\phi}_n] \, y_n{}^* \sin\phi_n$$

where, sign [A sin θ] A=|A| sign [sin θ]
sign [A cos θ] A=|A| sign [cos θ]

Further, if y and y* are approximated as ŷ and ŷ*, $$\hat{\phi}_n = |Y_n| \text{ sign } [\sin\hat{\phi}_n] \cos\phi_n - \tag{11}$$
$$|Y_n{}^*| \text{ sign } [\cos\hat{\phi}_n] \sin\phi_n +$$
$$\text{sign } [y_n{}^* \cos\hat{\phi}_n] \times y_n \cos\phi_n$$
$$\text{sign } [y_n \sin\hat{\phi}_n] \, y_n{}^* \sin\phi_n$$

The third term and fourth term at the right side of equation (11) are noncorrelative signals, so the expected value $E[\hat{\phi}_e]$ of the phase error $\hat{\phi}_e$ becomes as follows:

$$E[\hat{\phi}_e] \approx Y \sin(\hat{\phi}_n - \phi_n) \tag{12}$$
$$\approx Y(\hat{\phi}_n - \phi_n)$$
where,
$$Y = E[|y_n|] = E[|y_n{}^*|]$$

As will be understood from equation (12), the phase error $\hat{\phi}_e$ found from the equation (10) is proportional to the average amplitude of the far-end echo. Therefore, if the average amplitude is measured by the far-end echo amplitude measurement circuit 123 and the phase error $\hat{\phi}_e$ is divided by the amplitude Y (i.e., by |Y|) by the divider 124, it is possible to obtain the normalized phase error $\hat{\phi}'_e$. Based on this phase error $\hat{\phi}'_e$, the offset frequency is estimated by the offset frequency estimation circuit 92.

As explained above, according to the first embodiment of the present invention, it is possible to correct the frequency offset of a far-end echo in a stable manner not dependent on variations of the level of the far-end echo.

Note that to speed understanding of the invention, the afore-mentioned constituent elements are expressed as independent functional blocks, but in actuality they are realized in a program by software processing of a processor and the echo canceller is constituted by a microprocessor consisting of several chips. The same applies to the next explained second embodiment.

Below, an explanation will be made of the second embodiment. As mentioned before, the near-end echo canceller 70 and the far-end echo canceller 74 are refreshed using the same error signal $e_n$ (that is, the error signal e output from the subtraction circuit 77 in FIG. 3). This error signal $e_n$ is as follows in the conventional apparatus of FIG. 3:

$$e_n = y_{1,n} + y_{2,n} - \hat{y}_{1,n} - \hat{y}_{2,n} + \xi_n \tag{13}$$

Here, $y_1$ is the near-end echo, $y^2$ is the far-end echo, $\hat{y}_1$ is the output of the modulation circuit 71, $\hat{y}_2$ is the output of the modulation circuit 76, and $\xi$ is noise or another signal which cannot be cancelled.

Therefore, it is possible to find from the following equation the tap coefficient vector $\underline{h}_1$ of the near-end echo canceller 70 and the tap coefficient vector $\underline{h}_2$ of the far-end echo canceller 74. Note that here $\underline{a}_n$ is the input data vector of the near-end echo canceller 70 and that $\underline{b}_n$ is the input data vector of the far-end echo canceller 74.

$$\underline{\hat{h}}_{1,n+1} = \underline{\hat{h}}_{1,n} + \alpha \, (y_{1,n} - \hat{y}_{1,n}) \, \underline{a}_n + \alpha \, (y_{2,n} - \hat{y}_{2,n} + \xi_n) \, \underline{a}_n \tag{14}$$

$$\underline{\hat{h}}_{2,n+1} = \underline{\hat{h}}_{2,n} + (y_{2,n} - \hat{y}_{2,n}) \, \underline{b}_n + \alpha \, (y_{1,n} - \hat{y}_{1,n} + \xi_n) \, \underline{b}_n \tag{15}$$

In the conventional apparatus, when finding the tap coefficient of the echo canceller based on the above-mentioned equations (14) and (15), the third term on the right side in the equations is a noncorrelative signal, and so interferes with the estimation of the correct coefficient vector. In particular, the near-end echo is larger than the far-end echo by 40 to 50 dB in some cases, so in the training term before the communications, the far-end echo canceller will operate unstably and not be able perform correct adaptive operation in the period until the near-end echo canceller is sufficiently restrained and the residual near-end echo level becomes sufficiently small. In some cases, during that period, normal training cannot be performed.

Therefore, in the training, consideration may be given to the method of first training just the near-end echo canceller and after the residual echo of the nearend echo is suppressed to about the same level as the far-end echo, starting to train the far-end echo canceller and the attendant frequency offset correction circuit, thus preventing the far-end echo canceller from operating unstably. In this case, the level of the far-end echo is very different with each connection line, so it is necessary to measure the far-end echo level for the training with each communication. However, it is in general difficult to extract just the far-end echo from the echo signal and measure its level since the frequency band region is the same as the near-end echo.

Therefore, in the second embodiment of the present invention, a circuit which can accurately detect the timing at which the near-end echo is sufficiently suppressed to about the level of the far-end echo without the direct measurement of the level of the far-end echo during training is realized by a simple construction and thereby the training of the far-end echo canceller is started at a precise timing to eliminate instability in the training operation of the far-end echo canceller. This is very beneficial to the previously mentioned first embodiment wherein the assumption is the extraction of just the far-end echo.

Figure 9:
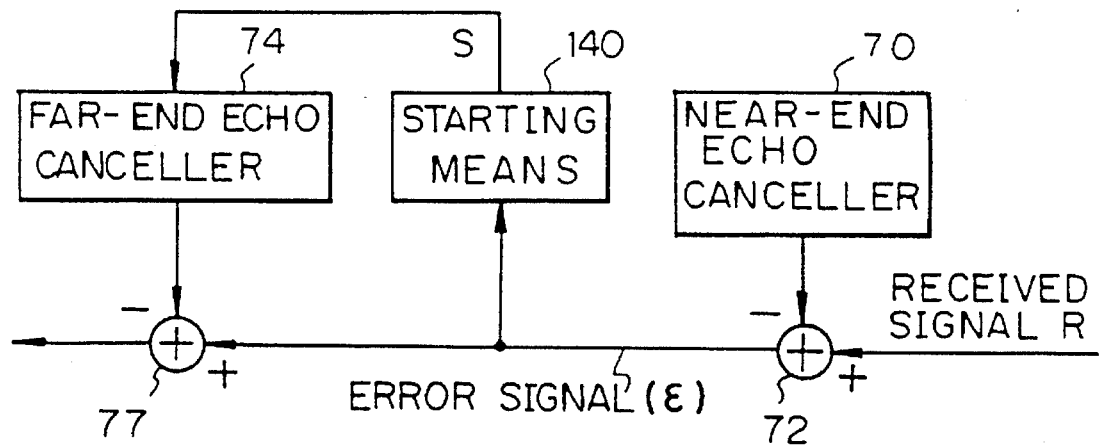
FIG. 9 is a block diagram of the principle of a second embodiment according to the present invention.

FIG. 9 is a block diagram of the principle of the second embodiment according to the present invention. The echo canceller according to the second embodiment of the present invention is provided with a starting means 140 which finds the rate of change of the error signal ε between the output signal of the near-end echo canceller 70 and the received signal R and starts the training of the far-end echo canceller when the rate of change is sufficiently small. The training of the near-end and far-end echo cancellers 70 and 74 is designed so that during the training, the training of only the near-end echo canceller 70 is first started and that the training of the far-end echo canceller 74 is started by the starting signal S from the starting means 140. In the figure, note, reference numerals 72 and 77 are subtraction circuits.

Next, an explanation will be given of the operation of the echo canceller of FIG. 9. In the training preceding the communications, first, training of only the near-end echo canceller 70 is performed. This enables adaptive determination of the tap coefficient of the near-end echo canceller 70. The near-end echo in the received signal R is gradually suppressed by the output signal of the near-end echo canceller 70, and the error signal ε which is the difference of the received signal R and the output signal of the near-end echo canceller 70, becomes gradually smaller. Finally, it is restrained to a certain level consisting of a noise component, far-end echo, or residual echo component which cannot be eliminated. Therefore, if the rate of change of the error signal ε is measured, it is possible to detect that the error signal has been restrained to a certain level by the fact of the rate of change becoming sufficiently small. If the training of the far-end echo canceller 74 is started at this timing, the residual level of the near end echo becomes about the same as the far-end echo and training is possible without instability of operation of the far-end echo canceller.

Figure 10:
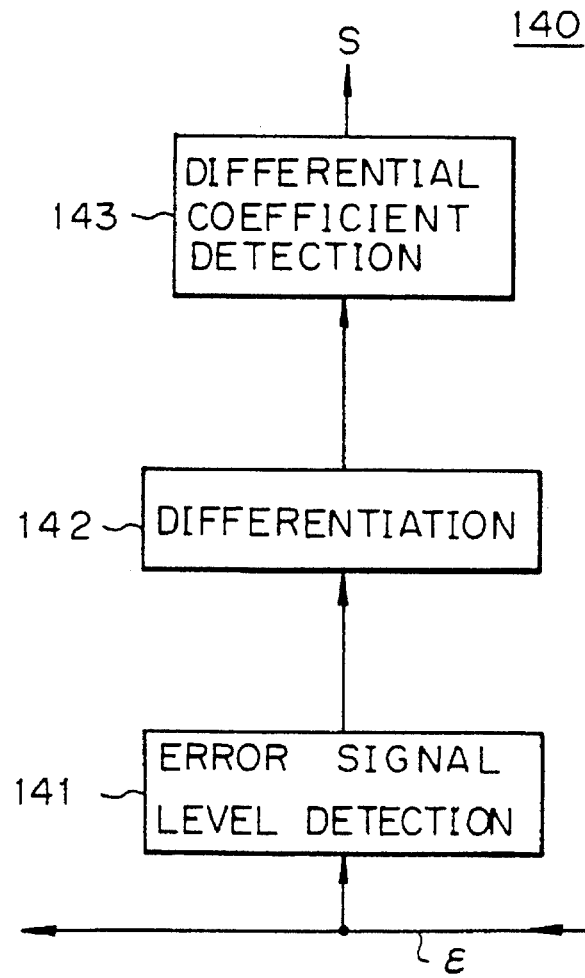
FIG. 10 is a block diagram showing in detail a starting means 140 of FIG. 9.

FIG. 10 is a block diagram showing in detail the starting means 140 of FIG. 9. The means includes an error signal level detecting means 141 which detects the level of the error signal ε, a differentiating means 142 which extracts the change in the error signal level detected, and a differential coefficient detecting means 143 which detects the differential coefficient of the output of the said differentiating means. The means 143 outputs a starting signal S when the differential coefficient becomes almost zero.

Figure 11:
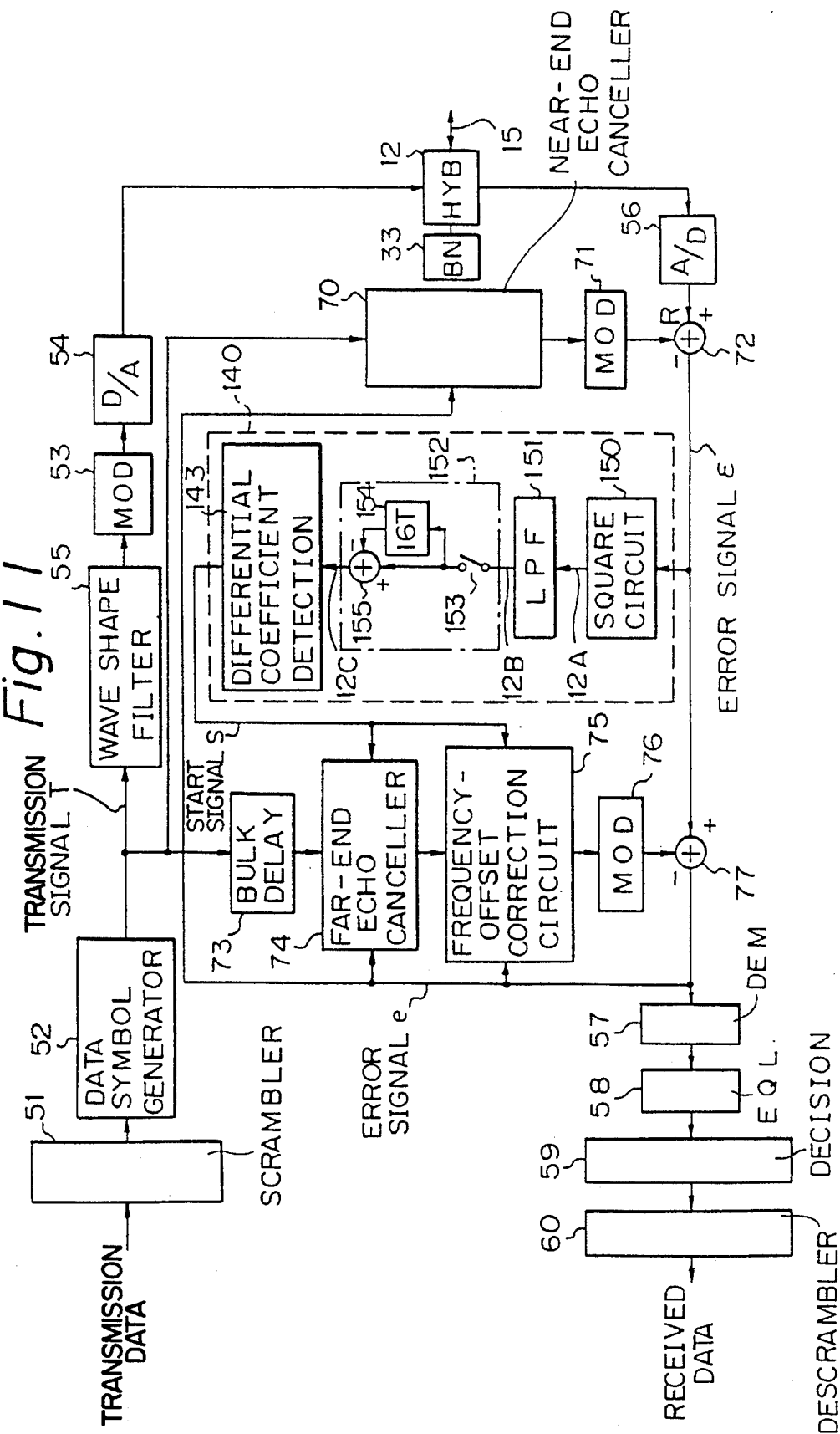
FIG. 11 is a circuit diagram of details of an echo canceller of the second embodiment according to the present invention.

FIG. 11 is a circuit diagram of details of an echo canceller of the second embodiment according to the present invention. In the figure, constituent elements the same as in FIG. 6 are given the same reference numerals or symbols.

The near-end echo canceller 70, the far-end echo canceller 74, and the frequency offset correction circuit 75 are constituted so as to be adaptively controlled by the error signal e output from the subtraction circuit 77, but the embodiment is set up so that the far-end echo canceller 74 and the frequency offset correction circuit 75 are begun to be trained only after receipt of a starting signal S from training starting means 140 shown by the broken lines in the figure.

The training starting means 140 includes a square circuit 150 which squares the error signal ε, obtained by subtracting the output signal of the near-end echo canceller 70 from the received signal R by the subtraction circuit 72, to find the power, a low pass filter (LPF) 151 which filters the output signal of the square circuit 150, a differentiating circuit 152 which differentiates the output signal of the low pass filter 151, and a differential coefficient detection means 143 which outputs a starting signal S to the far-end echo canceller 74 and frequency offset correction circuit 75 in accordance with when the output signal of the differentiating circuit 152 becomes zero or sufficiently small. Note that, referring to FIG. 10, the constituent element 141 of FIG. 10 is realized by the constituent elements 150 and 151 of FIG. 11, and the constituent element 142 of FIG. 10 is realized by the constituent element 152 (153, 154, and 155) of FIG. 11.

The differentiating circuit 152 includes a switch 153 for down-sampling to 1/16 the input signal by closing for one time with each 16 clock timings, a delay circuit 154 which delays the input signal by 16 clocks, and a subtraction circuit 155 which generates the differential of the input signal by taking the difference of the input signal and the output signal of the delay circuit 154. Regarding this down sampling circuit, the differential is obtained by the differentiating circuit 152 by taking the difference with the past sample, but usually the sampling frequency of the output signal of the subtraction circuit 72 is a high 9600 Hz or 7200 Hz or so, so the differential of the subtraction circuit 155 sometimes becomes too small. Therefore, the down sampling is performed so as to prevent this.

Figure 12A:
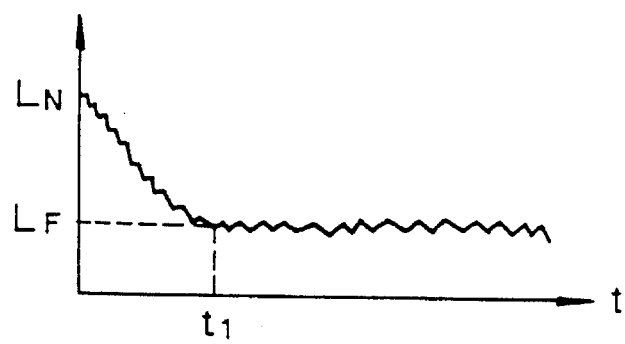
FIGS. 12A, 12B, and 12C are signal waveform diagrams of various portions of the training starting means for explaining the operation of the circuit of FIG. 11.
Figure 12B:
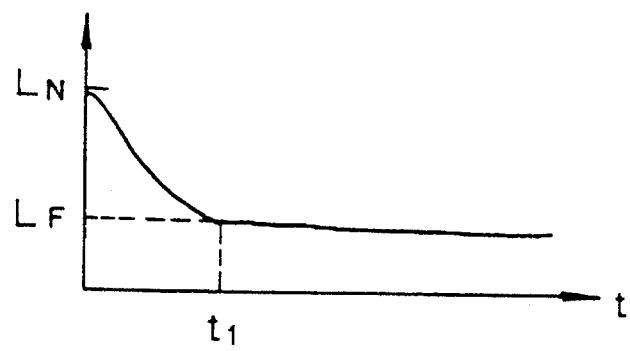
Figure 12C:
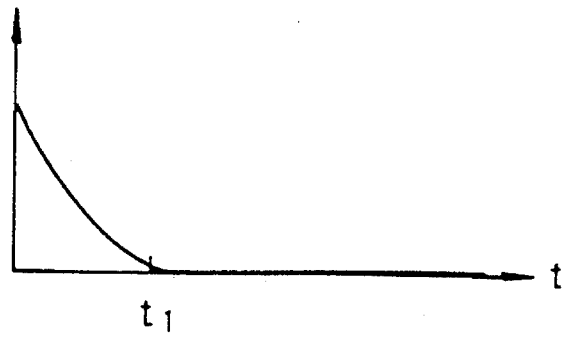

Below, an explanation will be made of the operation of the echo canceller of FIG. 11 with reference to FIGS. 12A, 12B, and 12C. FIGS. 12A, 12B, and 12C are diagrams of signal waveforms at various portions (12A, 12B, and 12C) of the training starting means 140 in FIG. 11. In the figure, FIG. 12A shows the restraint characteristics of the residual echo power in the case where just the near-end echo canceller is operated during training and shows the power of the input signal, i.e., error signal, to the training starting means 140, that is, the waveform of the output signal of the square circuit 150. FIG. 12B shows the waveform of the output signal of the low pass filter 151, and FIG. 12C shows the waveform of the output signal of the differentiating circuit 152.

First, training of the echo canceller is performed before the communication, but at the start of the training, only the near-end echo canceller 70 is trained, i.e., the far end echo canceller 74 and the frequency offset correction circuit 75 are in an idle state. The near-end echo canceller 70 is controlled adaptively in its tap coefficient by the error signal e of the output of the subtraction circuit 77. As a result, the A/D converted received signal R gradually has the near end echo removed at the output of the subtraction circuit 72. The residual component of the near-end echo, which was the level $L_N$ (L: Level, N: Near-end) at the start of the training as shown by FIG. 12A, gradually declines along with the restraint of the near-end circuit 70 and stabilizes at the level $L_F$ (F: Far-end) of either the far-end echo level or noise level, whichever is greater.

Therefore, the timing at which the training of the far-end echo canceller 74 is started may be made the timing $t_1$ where the residual echo level becomes $L_F$, so by squaring the residual echo signal ε by the square circuit 150 to obtain the power value and then smoothing the result by the low pass filter 151 to obtain the waveform of FIG. 12B and further by differentiating in time the result by the differentiating circuit 152 to obtain the waveform of FIG. 12C, the time $t_1$ can be detected by when the differential output signal of the differentiating circuit 152 becomes zero or sufficiently small. This is detected by the differential coefficient detecting means 143, which generates a starting signal S, whereby the training of the far-end echo canceller 74 and the frequency offset correction circuit 75 is started.

According to the above, it is possible to detect the optimum starting timing $t_1$ of the far-end echo canceller 74 without prior measurement of the far-end echo level $L_F$ by when the output signal of the differentiating circuit 152 becomes zero or sufficiently small.

In the working of the present invention, various modifications are possible. For example, in the above-mentioned embodiment, the input signal of the training starting means 140 was obtained from the subtraction circuit 72 directly after the removal of the far end echo, but the present invention is not limited to this. It is possible to obtain it from the error signal e from the subtraction circuit 77. Further, in the training starting means 140, the differential is found by converting the input signal to the power amount by the square circuit 150, but of course the differential may be found by the absolute value of the input signal.

As explained above, according to the second embodiment of the present invention, it is possible to realize, by a simple construction, a circuit which can accurately detect the timing at which, during training, the near-end echo is sufficiently suppressed to about the far-end echo level without direct measurement of the far-end echo level. By this, it is possible to prevent instability of the training operation of the far-end echo canceller by starting the training of the far-end echo canceller at a precise timing.

The function derived from the above-mentioned second embodiment can be effectively utilized in the first embodiment which operates by extracting just the far-end echo.

FIG. 13 is a block diagram of the principle of a third embodiment according to the present invention, which constitutes the previously mentioned second embodiment incorporated into the first embodiment. Note that all the constituent elements in FIG. 13 have been previously explained. In FIG. 13, the frequency offset correction circuit 75 starts operating only when the starting signal S is output.

Figures 14, 14A:
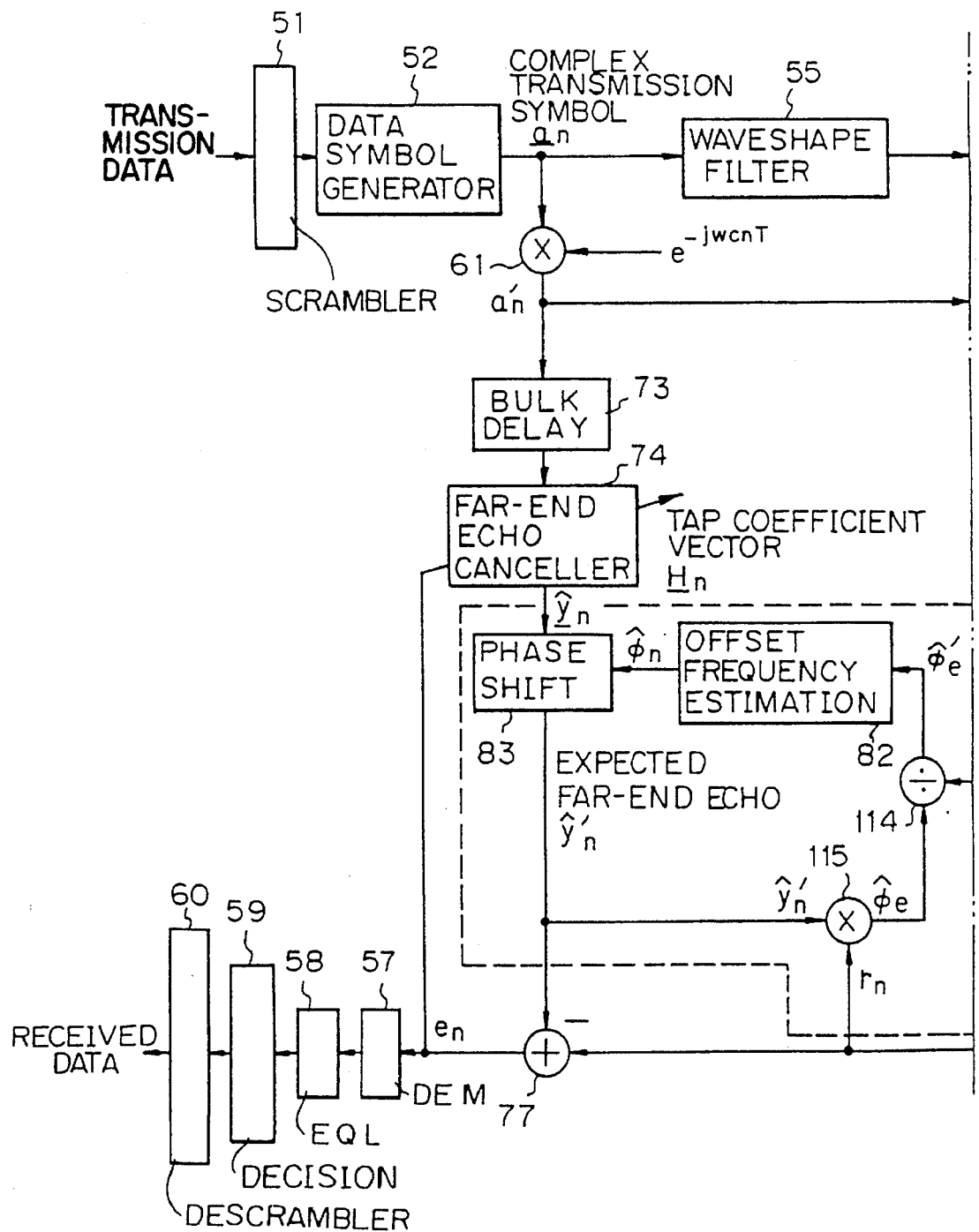
FIGS. 14A and 14B are circuit diagrams showing the third embodiment wherein the second embodiment according to the present invention is incorporated into the echo canceller of FIG. 6.
Figure 14B:
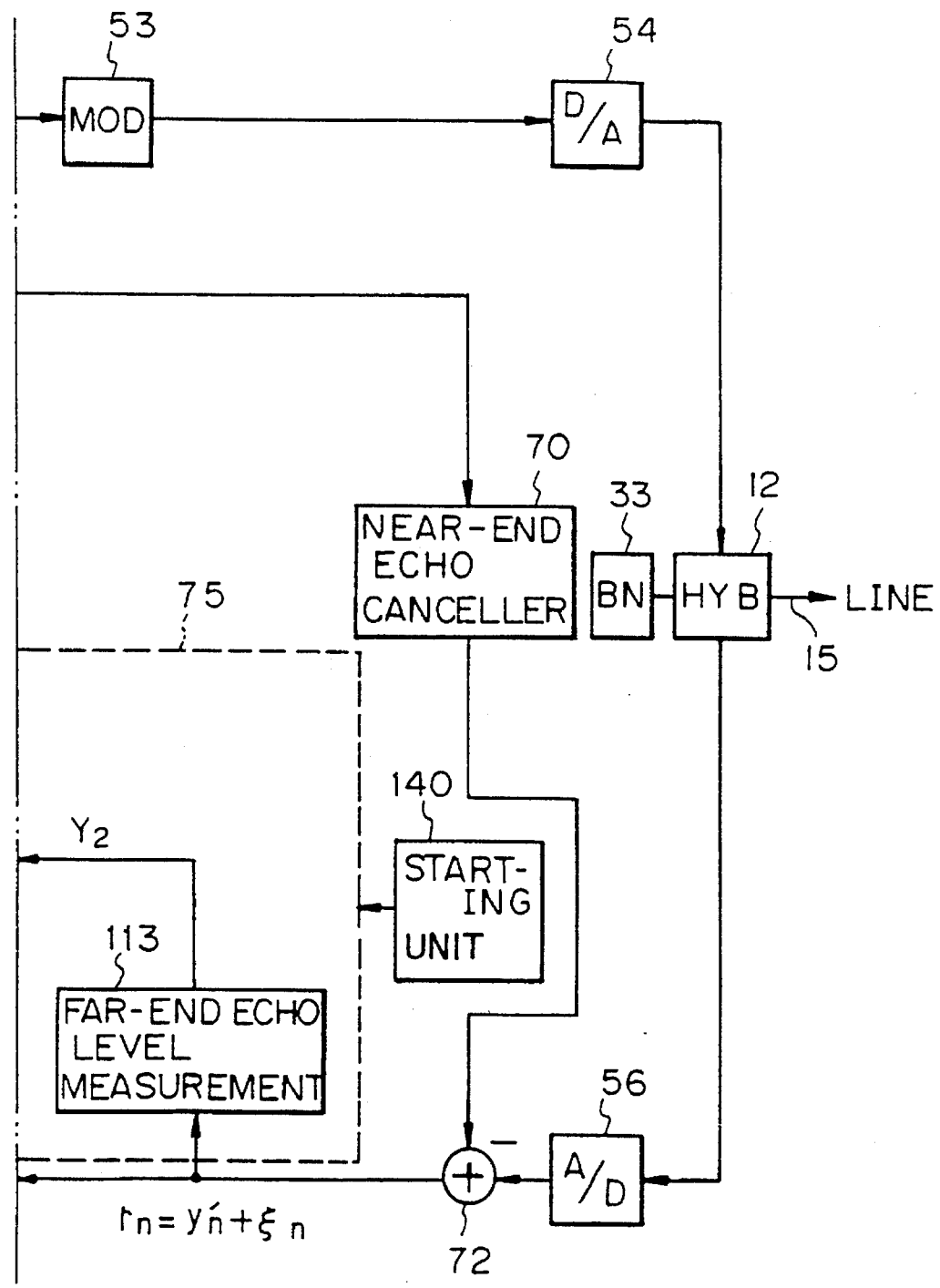

FIGS. 14A and 14B are circuit diagrams showing the third embodiment wherein the second embodiment according to the present invention is incorporated into the echo canceller of FIG. 6. All the constituent elements have already been explained.

For efficient operation of the echo canceller, use is generally made of a gain switch (SW). When the starting means 140 is incorporated into the echo canceller based on the above-mentioned second embodiment, consideration must be given to cooperation with the gain switch as well. Below, an explanation will be given of the reasons why the gain switch is needed. Further, an explanation will be given of the modifications which should be made to the gain switch when incorporating the above-mentioned second embodiment.

When the echo cancellation algorithm in the echo canceller is realized by fixed point calculation, it is desirable in reducing the calculation error that the level of the received signal input to the subtractor for subtracting the expected echo be made as large as possible without overflow of the tap coefficient or calculation value of the calculation process. This is because when the received signal, more precisely the echo level in the received signal, is small, the tap coefficient of the echo canceller becomes small and the number of digits of the effective numerals in a word becomes small, which causes calculation error.

In general, the far-end echo becomes the same level or lower as the far-end data signal. On the other hand, when the line attenuation is large, the near-end echo sometimes becomes larger than the far-end data signal by 30 dB or more.

Therefore, there are times when the output of the subtractor 72 (FIG. 14B), which subtracts the expected near-end echo from the received signal, becomes considerably small, but if this is input as is to the subtractor 77 (FIG. 14A), the calculation error of the far-end echo canceller becomes large. Therefore, a gain switch is inserted into the output of the subtractor 72 and thus the input of the subtractor 77 is held to a constant level.

FIG. 15 is a circuit diagram for explaining the gain switch generally used for echo cancellers. The gain of the gain switch 160 shown in the figure is found by measuring the level of the far-end data signal before the training of the echo canceller. Note that since in this case the input level of the subtractor 77 is maintained constant at all times, so it is possible to adaptively change the gain of the gain switch 160, but in this case it is necessary to change the gain of the far-end echo canceller as well along with this. Further, the effect of the echo canceller performing this adaptive operation is felt and the two become unstable in some cases, so this is not used too much.

On the other hand, the output of the subtractor 72 includes a large residual far-end echo before the completion of the training, so the level is large. Therefore, if a gain found from the far-end data signal is given in advance to the gain switch 160, the output overflows. For this reason, it is impossible to make the gain of the gain switch 160 a suitable value until the completion of the training of the echo canceller and the calculation error of the far-end echo canceller dwing the training becomes large.

The present invention attempts to resolve this problem of the prior art too and provides a data modem echo canceller which has a near-end echo canceller and far-end echo canceller, wherein it is possible to switch to the most suitable gain for each line and give the same to the gain switch during the training and therefore it is possible to reduce the calculation error during the training in the far-end echo canceller which performs the fixed decimal point computation.

Figure 16:
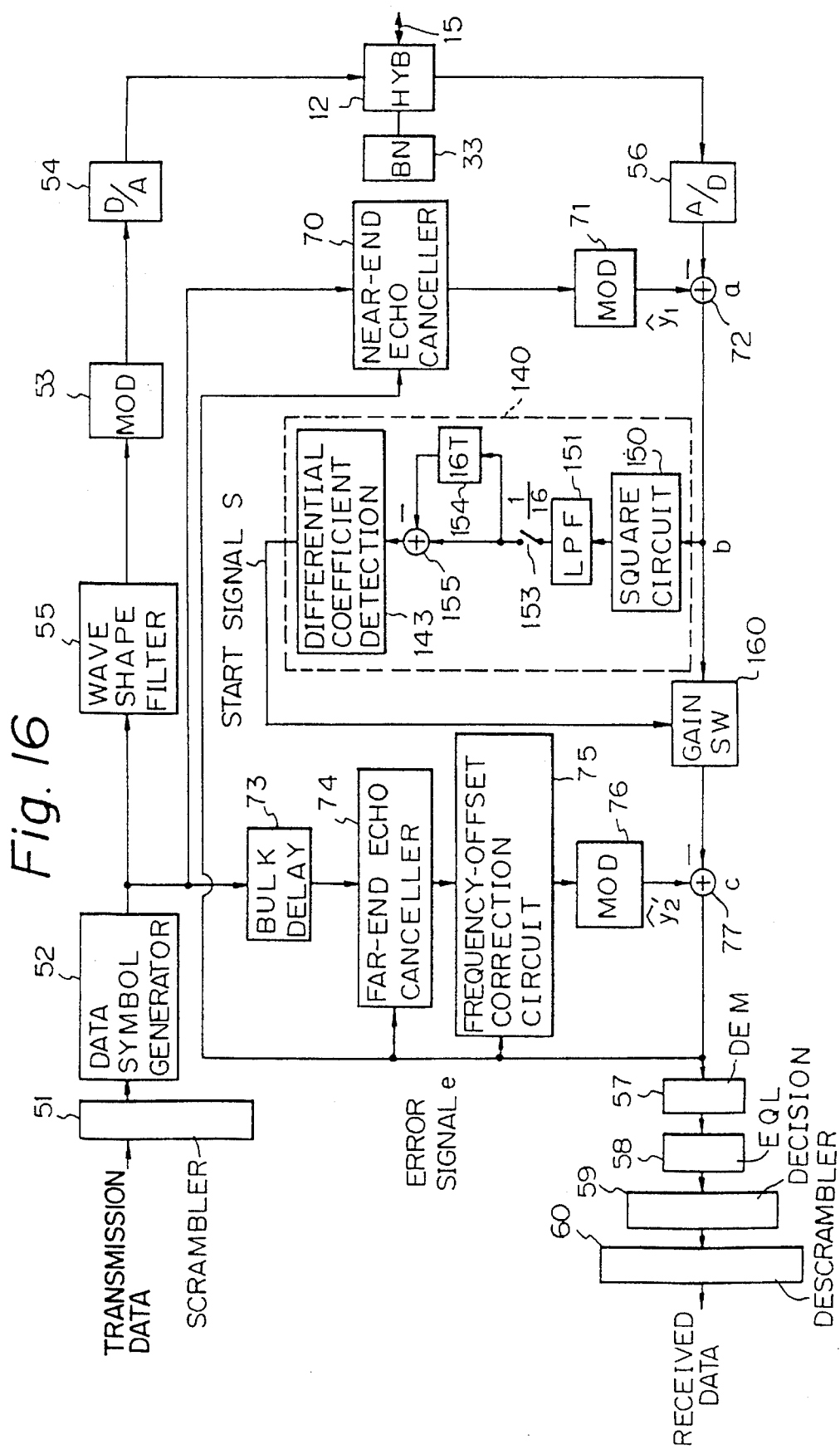
FIG. 16 is a view showing the circuit constitution when the starting means of the second embodiment is introduced into an echo canceller including a gain switch.

As shown in the embodiment of FIG. 16, there is provided an echo canceller having a first subtractor 72 which subtracts the expected near-end echo from the received signal, a gain switch 160 which amplifies the output of the first subtractor 72, and a second subtractor 77 which subtracts the extracted far-end echo from the output of the gain switch 160, which echo canceller is provided with a starting signal generating means 140, the gain of the amplifier 160 being made a predetermined low value during the training period of the echo canceller and being made a high value when the starting signal is generated from the starting signal generating means 140.

When the training starts, the gain of the gain switch 160 is made 1, it is judged when the rate of reduction of the error signal after subtracting the expected near-end echo from the received signal becomes small due to the restraint of the near-end echo canceller, and subsequent to this the gain of the gain switch is set to a pre-found value, whereby overflow of the gain switch output is prevented.

Therefore, the square mean value of the signal after removal of the near-end echo is found, the time when the differentiating value in time becomes zero or sufficiently small is detected, and a starting signal S for switching the gain in the gain switch is generated.

In FIG. 12A, the time t1 when the residual echo became a constant value was the time when the differential became zero or sufficiently small, as shown in FIG. 12C, so if the starting signal S is generated at that point of time, it is possible to switch the gain of the gain switch at the optimal timing even without measurement of the level $L_F$.

In this case, the level $L_F$ is the same as or smaller than the level of the far-end data signal, so even if the gain of the gain switch at the point of time $t_1$ determined as mentioned above is switched to a gain found in advance based on the level of the far-end data signal, the output of the gain switch will not overflow.

In FIG. 16, the differential coefficient detecting means 143 detects when the signal of the differential at the subtractor 155 becomes zero or sufficiently small and issues a starting signal. The gain switch 160 raises the gain of when this starting signal is received. In this way, the starting means 140 can judge the restraint of the near-end echo canceller by the differential of the output of the subtractor 72 becoming zero or sufficiently small and generate a starting signal which switches the gain of the gain switch 160.

The far-end echo canceller 74 is adaptively controlled by the error signal e at the output of the subtractor 77. By this, the expected far-end echo $y_2$ is subtracted at the subtractor 77 (point c) to remove the far-end echo, but the gain switch 160 at the input side of the subtractor 77 has a low gain at the start, so even when the far-end echo is not sufficiently removed, there is no overflow at the gain switch 160. Further, when the near-end echo is sufficiently removed at the output of the subtractor 72, the gain at the gain switch 160 rises by the starting signal S from the starting means 140, so it is possible to reduce the calculation error of the far-end echo at the subtractor 77. Therefore, with this echo canceller, even if use is made of a fixed decimal point calculation circuit, it is possible to reduce the calculation error of the far-end calculation circuit during the training.

Note that in the circuit of FIG. 16, the waveform shaping filter 55 is used to prevent the occurrence of interference between symbols defined by the multivalue signal output from the data symbol generating circuit 52.

As mentioned above, it is possible to generate a signal for switching the gain in the gain switch inserted between the expected near-end echo subtractor and expected far-end echo canceller during the training, so it is possible to reduce the calculation error during training at the far-end echo canceller which performs the fixed decimal point computation.

Figure 17:
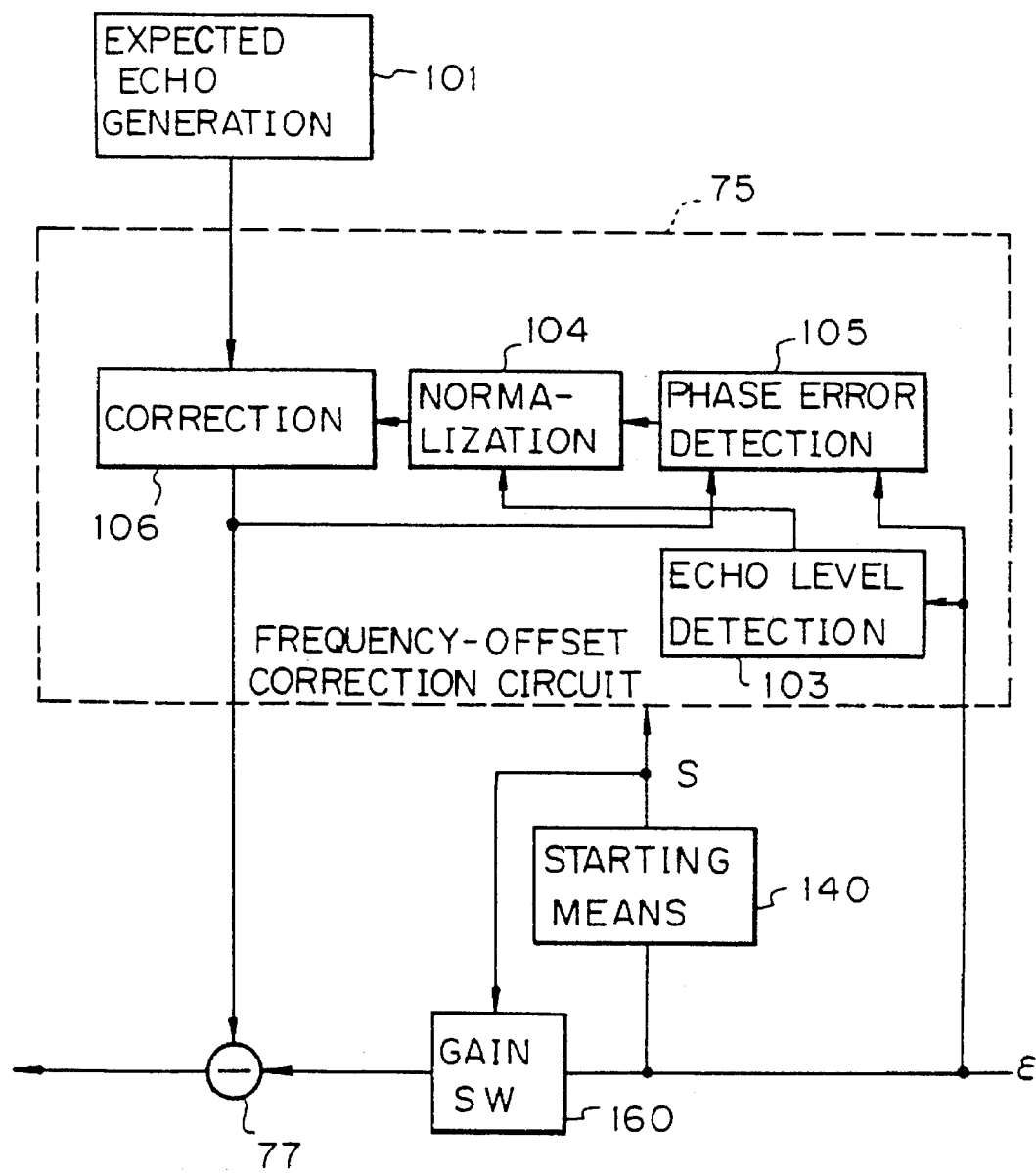
FIG. 17 is a view showing the constitution when the third embodiment is introduced into an echo canceller including a gain switch.

FIG. 17 is a view showing the constitution when the third embodiment is introduced into an echo canceller including a gain switch. This includes the constitution of FIG. 13 plus a gain switch 160 which is controlled by the starting signal S from the starting means 140.

As explained above, according to the present invention, an echo canceller is realized which can correct the frequency offset according to the far-end echo characteristics.

We claim:

1. An echo canceller wherein a first echo in a received signal is subject to having a frequency off-set error therein, comprising:

expected echo generating means for generating a second echo, comprising an expected echo of a transmission signal;

frequency offset correction means for detecting a phase error between the first echo in the received signal and the second, expected echo generated by said expected echo generating means and for correcting the frequency offset of said second, expected echo by an offset frequency which is estimated, based on the phase error detected by said frequency offset correction means, use being made of the second, expected echo, after frequency offset correction thereof by said frequency offset correction means, so as to suppress the first echo in the received signal, said frequency offset correction means further comprising:

echo level detection means for detecting the magnitude of the first echo in the received signal, and normalizing means for normalizing said detected phase error according to the detected magnitude of the first echo as detected by said echo level detection means and producing a corresponding output, said offset frequency being estimated, based on said output of said normalizing means.

2. An echo canceller according to claim 1, wherein said echo canceller comprises a component of a two-wire full duplex data modem.

3. An echo canceller according to claim 1, wherein:

said echo level detection means detects said magnitude of said first echo, in the received signal, in accordance with a power level of said first echo in the received signal and produces a corresponding power level detection output; and said frequency off-set correction means further comprises:

phase error detection means for receiving as an input the received signal and producing a corresponding phase error detection output, said normalizing means receiving, as inputs, the phase error detection output from said phase error detection means and the power level detection output from said echo level detection means and producing a corresponding normalized output, and correction means for correcting said offset frequency by using said normalized output.

4. An echo canceller according to claim 3, wherein said normalizing means further comprises a divider which divides the phase error detection output from said phase error detection means by the power level detection output from said echo level detection means.

5. An echo canceller according to claim 3, wherein said phase error detection means further comprises a multiplier which multiplies the expected echo, the offset frequency of which has been corrected by said correction means, with the received signal.

6. An echo canceller according to claim 3, wherein said correction means further comprises an offset frequency estimation unit for producing an output and a phase shift unit which is controlled by the output of said off-set frequency estimation unit, the second, expected echo being corrected as to offset frequency by said phase shift unit and which produces as an output thereof the expected echo without frequency off-set.

7. An echo canceller according to claim 1, wherein said frequency offset correction means further comprises:

phase error detection means for receiving, as an input, the received signal;

said normalizing means, which receives as an input thereto the detection output from the said phase error detection means and the detection output from the said echo level detection means; and a correction unit which corrects the offset frequency by the output of said normalizing means.

8. An echo canceller according to claim 7, wherein the normalizing means further comprises a divider which divides the phase error detection output of said phase error detection means by the power level detection output of said echo level detection means.

9. An echo canceller according to claim 7, wherein said phase error detection means further comprises a multiplier which multiplies the second, expected echo, the offset frequency of which has been corrected by said correction means, with the received signal.

10. An echo canceller according to claim 9, wherein said correction unit further comprises an offset frequency estimation unit and a phase shift unit which is controlled by the output of the off-set frequency estimation unit, the second, expected echo being corrected as to frequency offset by said phase shift unit, which produces as an output thereof the expected echo without frequency off-set.

11. An echo canceller according to claim 10, wherein said phase shift unit further comprises a first multiplier and a second multiplier which respectively multiply said second, expected echo by a first rotational phase and a second rotational phase, which deviate from each other by a phase of $\pi/2$, and are output said offset frequency estimation unit, and produce corresponding product outputs and an adder which adds the corresponding product outputs of the first and second multipliers and produces the expected echo without frequency off-set as the output thereof, said phase error detection means further comprises a first sign function unit and a second sign function unit which respectively receive, as inputs thereto, the outputs of said first and second multipliers, and said second multiplier further comprises a third multiplier and a fourth multiplier and the frequency offset corrected, second expected echo to be input thereto is applied via said first and second sign function units.

12. An echo canceller according to claim 1, further comprising:

a near-end echo canceller for processing the received signal and cancelling a near-end echo therein and producing a corresponding near-end echo cancelled output in which a near-end echo in the received signal is substantially removed but in which an error signal ε potentially remains;

a far-end echo canceller, said frequency off-set correction means performing said frequency off-set correction in relation to said far-end echo processed by said far-end echo canceller; and starting means for generating a starting signal for starting the training of only said near-end echo canceller and then, in sequence, starting the training of said far-end echo canceller.

13. An echo canceller according to claim 12, wherein said starting means further comprises:

error signal level detecting means for detecting a level of any error signal ε in the near-end echo cancelled output, after cancellation of the near-end echo from the received signal by the near-end echo canceller and producing a corresponding output signal;

differentiating means for extracting changes of the output signal from of said error signal level detecting means and producing a corresponding output signal; and differential coefficient detecting means for detecting a the differential coefficient of the output of said differentiating means and outputting the starting signal when said differential coefficient becomes almost zero.

14. An echo canceller according to claim 13, wherein:

said error signal level detecting means further comprises a squaring circuit which receives, as an input, the error signal ε and produces a corresponding, squared output signal and a low pass filter which performs filtering of the squared output signal of said squaring circuit and produces a corresponding low pass filtered output; and said differentiating means further comprises a substraction circuit and a delay circuit, the low pass filtered output of said low pass filter being commonly applied to a first input of said subtraction circuit and an input of said delay circuit, an output of said delay circuit being applied to a second input of said subtraction circuit.

15. An echo canceller according to claim 14, further comprising a switch inserted between said error signal level detecting means and said differentiating means, said switch being periodically made conductive and nonconductive for down sampling.

16. An echo canceller according to claim 12, further comprising:.

first subtraction means for cancelling the near-end echo and a second subtraction means for cancelling the far-end echo; and a gain switch connected between the first and second subtraction means, the gain of said gain switch being made low when first starting the training and thereafter being made high, responsive to the starting signal from said starting means.

17. An echo canceller for processing a received signal, comprising:

a near-end echo canceller for processing the received signal and cancelling a near-end echo therein and producing a corresponding near-end echo cancelled output in which a near-end echo in the received signal is at least substantially removed but in which an error signal ε potentially remains;

a far-end echo canceller;

starting means for generating a starting signal for starting the training of only said near-end echo canceller and then, in sequence, starting the training of said far-end echo canceller;

error signal level detecting means for detecting a level of any error signal ε in the near-end echo cancelled output, after cancellation of the near-end echo from the received signal by the near-end echo canceller, and producing a corresponding output signal;

differentiating means for extracting changes of the output signal of said error signal level detecting means and producing a corresponding output; and differential coefficient detecting means for detecting a differential coefficient of the output of said differentiating means and outputting the starting signal when said differential coefficient becomes almost zero.

18. An echo canceller according to claim 17, further comprising:

first subtraction means for cancelling the near-end echo and a second subtraction means for cancelling the far-end echo; and a gain switch connected between the first and second subtraction means, the gain of said gain switch being made low when first starting the training and thereafter being made high, responsive to the starting signal from said starting means.

19. An echo canceller for use in a data transmitting and receiving system connected to a communications network, wherein a transmission data signal transmitted by the system over the network produces an echo signal in a data signal transmitted over the network to, and received by, the system, the echo canceller comprising:

expected echo signal generating means for generating an expected echo signal corresponding to a transmission signal being transmitted;

means for generating and producing as an output a corrected, expected echo signal, and comprising:

echo level detecting means for detecting the level of an echo signal in the received signal and producing, as an output, the detected level of the echo signal;

phase error detecting means for detecting and producing, as an output, a phase error between the echo signal in a received signal and the corresponding expected echo signal output of the expected echo signal generating means;

normalizing means, responsive to the detected level of the echo signal in the received signal, for normalizing the detected phase error, as output by the phase-error detecting means, and producing a normalized phase error output; and means, responsive to the normalized phase error output of the normalizing means, for correcting the frequency offset of the expected echo signal output of the expected echo signal generating means and thereby producing the corrected, expected echo signal output of said frequency offset correction means; and means responsive to the corrected, expected echo signal, for suppressing the echo signal in the signal received by the transmitting and receiving system.

20. An echo canceller as recited in claim 19, wherein said transmitting and receiving system comprises a two-wire, full duplex data modem.

21. An echo canceller as recited in claim 19, wherein the level of the echo signal in the received signal is detectable in accordance with either or both of the amplitude and power of the echo signal, and wherein:

said echo level detecting means detects the power level of the echo signal in the received signal;

the phase error detecting means receives, as inputs thereto, the received signal and the expected far-end echo signal output of said expected echo signal generating means; and said normalizing means receives as inputs thereto the detected phase error output of said phase error detecting means and the detected power level output of said echo level detecting means.

22. An echo canceller as recited in claim 21, wherein said normalizing means comprises divider means for dividing the detected phase error output of said phase-error detecting means by the detected power level output of said power level detecting means.

23. An echo canceller as recited in claim 21, wherein said phase-error detecting means comprises multiplier means for multiplying a current sample of the received signal by the corrected, expected echo signal produced for the respectively next preceding sample of the received signal and producing the product thereof as the phase error output thereof.

24. An echo canceller as recited in claim 21, wherein said correcting means comprises:

offset frequency estimation means responsive to the normalized phase error output of said normalization means for producing a phase rotation output corresponding to an estimation of the frequency offset of the expected error signal relative to the corresponding echo signal in the received signal; and phase shift means responsive to the phase rotation output of said offset frequency estimation means for shifting the phase of the expected echo signal and producing thereby the corrected, expected echo signal output.

25. An echo canceller as recited in claim 19, wherein the level of the echo signal in the received signal is detectable in accordance with either or both of the amplitude and power of the echo signal, and wherein:

said echo level detecting means detects the amplitude level of the echo signal in the received signal;

the phase error detecting means receives as inputs thereto the received signal and the expected far-end echo signal output of said expected error signal generating means; and said normalizing means receives as inputs thereto the detected phase error output of said phase error detecting means and the detected amplitude level output of said echo level detecting means.

26. An echo canceller as recited in claim 25, wherein said normalizing means comprises divider means for dividing the detected phase-error output of said phase error detecting means by the detected amplitude level output of said echo level detecting means.

27. An echo canceller as recited in claim 25, wherein said phase error detecting means comprises multiplier means for multiplying a current sample of the received signal by the corrected, expected echo signal produced for the next preceding sample of the received signal and producing the product thereof as the phase error output thereof.

28. An echo canceller as recited in claim 27, wherein said correcting means comprises:

offset frequency estimation means responsive to the normalized phase error output of said normalization means for producing a phase rotation output corresponding to an estimation of the frequency offset of the expected error signal relative to the corresponding echo signal in the received signal; and phase shift means responsive to the phase rotation output of said offset frequency estimation means for shifting the phase of the expected echo signal and producing thereby the corrected, expected echo signal output.

29. An echo canceller as recited in claim 28, wherein each of said expected echo signal and said corrected, expected echo signal comprises real and imaginary components of corresponding vector quantities thereof, and wherein:

said offset frequency estimation means produces first and second, $\pi/2$ phase differing, phase rotation outputs corresponding to an estimation of the frequency offset of the expected error signal relative to the corresponding echo signal in the received signal;

said phase shift unit comprises first and second multiplier means, respectively receiving corresponding ones of the real and imaginary components of the expected echo signal, for multiplying same by respective ones of said first and second, $\pi/2$ phase differing, phase rotation outputs and producing first and second corresponding product outputs, and adder means for adding the first and second product outputs of said respective first and second multiplier means and producing thereby the corrected, expected echo signal output; and said phase error detecting means comprises first and second sign function means, respectively receiving the first and second product outputs of said first and second multiplier means, for producing corresponding, first and second sign function product outputs, third and fourth multiplier means, respectively receiving the first and second sign function product outputs of said first and second sign function units, for multiplying same by the received signal and producing, respectively, third and fourth multiplication product outputs, and second adder means for adding the third and fourth multiplication product outputs and thereby producing the sum of the third and fourth multiplication product outputs as the phase error output.

30. An echo canceller for use in a data transmitting and receiving system wherein a transmission data signal transmitted thereby produces near-end and far-end echo signals in a data signal received thereby, comprising:

near-end echo canceller means for generating an expected near-end echo signal and for subtracting same from the received signal to suppress the near-end echo signal contained in the received signal;

far-end echo canceller means for receiving, from the near-end echo canceller means, the received signal with the near-end echo signal suppressed therein and comprising means for generating an expected, far-end echo signal corresponding to a transmission signal being transmitted, means for generating a corrected, expected far-end echo signal, and means responsive to the corrected, expected far-end echo signal and to the received signal from the near-end echo canceller means with the near-end echo signal suppressed therein, for suppressing the far-end echo signal therein; and means for training each of said near-end and far-end echo canceller means, said training means including starting means for controlling the timing and sequence of operation of said training means during a training interval preceding a data communication interval, said starting means initiating the training by said training means of only said near-end echo canceller at the beginning of a training interval and, in response to substantially complete cancellation of the near-end echo, issuing a start signal for initiating the training by said training means of said far-end echo canceller.

31. An echo canceller as recited in claim 30, wherein said means for generating and producing a corrected, expected far-end echo signal output further comprises:

far-end echo level detecting means for detecting the level of a far-end echo signal in the received signal and producing, as an output, the detected level of the far-end echo signal;

phase error detecting means for detecting and producing, as an output, a phase error between the far-end echo signal in a received signal and the corresponding, expected far-end echo signal output of the expected far-end echo signal generating means; and normalizing means, responsive to the detected level of the far-end echo signal in the received signal, for normalizing the detected phase error, as output by the phase-error detecting means, and producing a normalized phase error output.

32. An echo canceller as recited in claim 31, wherein said starting means comprises:

echo signal level detecting means for detecting the level of the echo signal in the received signal after substantially complete cancellation of the near-end echo, thereby to produce, as a detection output, the level of the far-end error signal in the received signal;

differentiating means for extracting changes in the far-end error signal level detection output of the far-end echo signal level detecting means and generating a corresponding differential coefficient output; and differential coefficient detecting means for detecting the value of the differential coefficient output of said differentiating means becoming almost zero and, in response thereto, for outputting the starting signal to initiate training of the far-end echo canceller means.

33. An echo canceller as recited in claim 32, wherein:

said far-end echo signal level detecting means comprises a squaring circuit means for receiving and squaring the aforesaid far-end echo signal and producing a corresponding output signal, and a low pass filter means for filtering the squared output signal of said squaring circuit means and producing a corresponding low pass filtered output; and said differentiating means comprises a substraction circuit means having first and second inputs and a delay circuit means having an input, each of said subtraction and delay circuit means having respective outputs, the low pass filter output being applied commonly to the first input of said substraction circuit means and to the input of said delay circuit means, and the output of said delay circuit means being applied to the second input of said substraction circuit means.

34. An echo canceller as recited in claim 33, further comprising:

a switch having conductive and nonconductive states, connected between said echo signal level detecting means and said differentiating means; and means for periodically changing said switch between the conductive and nonconductive states thereof, to perform down sampling.

35. An echo canceller as recited in claim 30, wherein:

said near-end echo canceller means comprises a near-end echo subtraction means having an input and an output, the received signal being supplied to the input thereof; and said suppressing means of said far-end canceller means comprises a far-end subtraction means having an input and an output, the input being connected to the output of said near-end subtraction means and the far-end substraction means subtracting the corrected, expected echo signal from the signal received at the input thereof from the output of the near-end subtraction means and producing, at the output thereof, the received signal in which the far-end echo signal is suppressed.

36. An echo canceller as recited in claim 35, further comprising:

gain control means connected between the output of said near-end subtraction means and the input of said far-end subtraction means and having low and high gain states, said gain control means establishing a low gain at the beginning of the training term and being responsive to the starting signal output of said starting means to switch to a high gain state upon substantial cancellation of the near-end echo signal from the received signal and at the initiation of training of the far-end echo canceller means.

37. An echo canceller for use in a data transmitting and receiving system wherein a transmission data signal transmitted thereby produces near-end and far-end echo signals in a data signal received thereby, comprising:

near-end echo canceller means for generating an expected near-end echo signal and for subtracting same from the received signal to suppress the near-end echo signal contained in the received signal;

far-end echo canceller means for receiving, from the output of the near-end echo canceller means, the received signal with the near-end echo signal suppressed therein, for generating an expected far-end echo signal and for subtracting same from the received signal with the near-end echo signal suppressed therein, thereby to suppress the far-end echo signal contained in the received signal; and means for training each of said near-end and far-end echo canceller means, said training means including starting means for controlling the timing and sequence of operation of said training means during a training interval preceding a data communication interval, said starting means initiating the training by said training means of only said near-end echo canceller at the beginning of a training interval and, in response to substantially complete cancellation of the near-end echo, issuing a start signal for initiating the training by said training means of said far-end echo canceller.

38. An echo canceller as recited in claim 37, wherein said starting means comprises:

echo signal level detecting means for detecting the level of the echo signal in the received signal after substantially complete cancellation of the near-end echo, thereby to produce, as a detection output, the level of the far-end error signal in the received signal;

differentiating means for extracting changes in the far-end error signal level detection output of the far-end echo signal level detecting means and generating a corresponding differential coefficient output; and differential coefficient detecting means for detecting the value of the differential coefficient output of said differentiating means becoming almost zero and, in response thereto, for outputting the starting signal to initiate training of the far-end echo canceller means.

39. An echo canceller as recited in claim 37, wherein:

said near-end echo canceller means comprises a near-end echo subtraction means having an input and an output, the received signal being supplied to the input thereof; and said suppressing means of said far-end canceller means comprises a far-end subtraction means having an input and an output, the input being connected to the output of said near-end subtraction means and the far-end substraction means subtracting the corrected, expected echo signal from the signal received at the input thereof from the output of the near-end subtraction means and producing, at the output thereof, the received signal in which the far-end echo signal is suppressed.

40. An echo canceller as recited in claim 39, further comprising:

gain control means connected between the output of said near-end subtraction means and the input of said far-end subtraction means and having low and high gain states, said gain control means establishing a low gain at the beginning of the training term and being responsive to the starting signal output of said starting means to switch to a high gain state upon substantial cancellation of the near-end echo signal from the receive signal and at the initiation of training of the far-end echo canceller means.

\* \* \* \* \*

UNITED STATES PATENT AND TRADEMARK OFFICE
CERTIFICATE OF CORRECTION

PATENT NO. : 5,528,687
DATED : June 18, 1996
INVENTOR(S) : TANAKA et al.

Page 1 of 2

It is certified that error appears in the above-indentified patent and that said Letters Patent is hereby corrected as shown below:

Col. 1, line 4, change "08,080,173" to --08/080, 137--;
line 23, change "Am" to --An--.

Col. 4, line 40, change "$\hat{e}_e$" to --$\hat{\phi}_e$--; and change "far-end error" to --far-end echo--;
line 50, change "signal $\hat{y}'_n$" to --signal $y'_n$--;
line 58, after "82" insert --,--;
line 62, change "$\hat{y}'_n$" to --$y'_n$--; and after "offset" insert --,--;
line 63, change "$\hat{y}'_n$" to --$y'_n$--;
line 65, change "$\hat{y}'_n$" to --$y'_n$--; and delete "A";
line 66, change "en" to --$e_n$--.

Col. 5, line 6, change "$\hat{y}'_n$" to --$y'_n$--;
line 13, change "$\hat{y}'_n$" to --$y'_n$--;
line 17, change "$\hat{y}'_n$" to --$y'_n$--;
line 19, change "$\hat{y}'_n$" to --$y'_n$--;
line 21, change "$\hat{y}'_n$" to --$y'_n$--.

Col. 6, line 14, change "$\hat{y}_n$" to --$\hat{\underline{y}}_n$--;
line 17, change "$\hat{y}'_n$" to --$y'_n$--;
line 29, change "$y^2$" to --$Y^2$--; and change "$\hat{y}'_n$" to --$y'_n$--;
line 33, change "$y^2$" to --$Y^2$--;
line 59, change "$\hat{y}'_n$" to --$\hat{\underline{y}}_n$--;
line 64, in equation (4), before the first equal sign " = " should read: --$\hat{\underline{y}}_n$--.

Col. 7, line 5, change "$Y'_n$" to --$y'_n$--;
line 7, in equation (5), before the first equal sign " = " should read: --$\hat{y}'_n$--;
lines 25-26, in equation (7), after the first equal sign " = " should read: --$\hat{y}'_n$--; after the second equal sign " = " should read: --$\hat{y}'_n$--;
line 30, after "Here," insert --$\xi_n$--;
line 40, change " ·nT and" insert --·nT, and,--;

UNITED STATES PATENT AND TRADEMARK OFFICE
CERTIFICATE OF CORRECTION

PATENT NO. : 5,528,687
DATED : June 18, 1996
INVENTOR(S) : TANAKA et al.

It is certified that error appears in the above-indentified patent and that said Letters Patent is hereby corrected as shown below:

Col. 7, line 49, in equation (8), second line, change "+(yn" to --+($y_n$--; and change "$y_n^*$" to --+ $y_n^*$--;
line 64, change "$y^2$" to --$Y^2$--.

Col. 8, line 6, change "$\phi'_e$" to --$\hat{\phi}'_e$--;
line 10, change "$\phi'_e$" to --$\hat{\phi}'_e$--;
line 12, change "$y^2$" to --$Y^2$--.

Col. 9, line 20, in equation (11), after the third line, insert minus sign -- - --;
line 60, change "$y^2$" to --$Y^2$--.

Col. 13, line 63, change "dwing" to --during--.

Col. 16, line 50 (Claim 11, line 6), after "output" insert --by--.

Col. 17, line 20 (Claim 13, line 9), change "signal from of" to --signal to--;
line 22 (Claim 13, line 11), change "a the" to --a--.

Signed and Sealed this

Second Day of September, 1997

Attest:

BRUCE LEHMAN

*Attesting Officer*    Commissioner of Patents and Trademarks